(12) United States Patent
Guthrie et al.

(10) Patent No.: US 7,881,010 B2
(45) Date of Patent: Feb. 1, 2011

(54) PROCESS FOR SELF-ALIGNED FLARE POINT AND SHIELD THROAT DEFINITION PRIOR TO MAIN POLE PATTERNING

(75) Inventors: Hung-Chin Guthrie, Saratoga, CA (US); Ming Jiang, San Jose, CA (US); Edward Hin Pong Lee, San Jose, CA (US); Aron Pentek, San Jose, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 664 days.

(21) Appl. No.: 11/956,277

(22) Filed: Dec. 13, 2007

(65) Prior Publication Data

US 2009/0152234 A1    Jun. 18, 2009

(51) Int. Cl.
*G11B 5/187* (2006.01)
(52) U.S. Cl. ............. 360/122; 360/125.51; 360/125.42; 360/125.46; 360/125.59
(58) Field of Classification Search ........................ None
See application file for complete search history.

(56) References Cited

U.S. PATENT DOCUMENTS

| | | | |
|---|---|---|---|
| 5,935,644 A | 8/1999 | Heim et al. | 427/116 |
| 6,477,765 B1 * | 11/2002 | Herrera | 29/603.14 |
| 6,553,649 B1 | 4/2003 | Santini | 29/603.14 |
| 6,557,242 B1 | 5/2003 | Santini | 29/603.14 |
| 6,560,853 B1 | 5/2003 | Santini | 29/603.14 |
| 7,061,717 B2 | 6/2006 | Takano | 360/126 |
| 7,061,719 B2 | 6/2006 | Matono et al. | 360/126 |
| 7,151,647 B2 | 12/2006 | Sasaki et al. | 360/126 |
| 7,159,302 B2 | 1/2007 | Feldbaum et al. | 29/603.12 |
| 7,587,811 B2 * | 9/2009 | Balamane et al. | 29/603.16 |
| 7,715,147 B2 * | 5/2010 | Feldbaum et al. | 360/125.3 |
| 2002/0026705 A1 | 3/2002 | Santini | 29/603.12 |
| 2003/0137771 A1 | 7/2003 | Emilio Santini | 360/126 |
| 2003/0137779 A1 | 7/2003 | Santini et al. | 360/317 |

(Continued)

OTHER PUBLICATIONS

Batra et al., "A Perpendicular Write Head Design for High Density Recording" IEEE Transactions on Magnetics, vol. 38, No. 1, Jan. 2002.

(Continued)

*Primary Examiner*—Duy-Vu N Deo
(74) *Attorney, Agent, or Firm*—Zilka-Kotab, PC

(57) ABSTRACT

A method for manufacturing a magnetic write head having a write pole with a flared step feature that defines a secondary flare point. The method involves depositing a magnetic write pole material on a substrate and then depositing a magnetic material over the write pole material followed by a non-magnetic material. A first mask is formed having a front edge to define the location of the secondary flare point, and one or more material removal processes are used to remove portions of the magnetic layer and non-magnetic layer that are not protected by this first mask. The first mask is replaced by a second mask that is configured to define a write pole, and an ion milling is performed to define the write pole. Shadowing from the magnetic layer and non-magnetic layer form a flared secondary flare point.

20 Claims, 35 Drawing Sheets

U.S. PATENT DOCUMENTS

| | | | |
|---|---|---|---|
| 2005/0068669 A1 | 3/2005 | Hsu et al. | 360/125 |
| 2006/0002016 A1 | 1/2006 | Nikitin et al. | 360/125 |
| 2006/0002024 A1 | 1/2006 | Le et al. | 360/126 |
| 2006/0012914 A1 | 1/2006 | Matono | 360/126 |
| 2006/0044682 A1 | 3/2006 | Le et al. | 360/126 |
| 2006/0238916 A1 | 10/2006 | Sasaki et al. | 360/126 |
| 2008/0074782 A1* | 3/2008 | Guthrie et al. | 360/110 |

OTHER PUBLICATIONS

Williams et al., "Perpendicular Write Process and Head Design" IEEE Transactions on Magnetics, vol. 38, No. 4, Jul. 2002.

* cited by examiner

PROCESS FOR SELF-ALIGNED FLARE POINT AND SHIELD THROAT DEFINITION PRIOR TO MAIN POLE PATTERNING

FIELD OF THE INVENTION

The present invention relates to perpendicular magnetic recording and more particularly to a method for manufacturing a perpendicular magnetic write head having a self aligned and trailing shield throat, defined prior to write pole width definition.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, referred to as a spacer layer or barrier layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head having a write pole with a flared step feature that defines a secondary flare point. The method involves depositing a magnetic write pole material on a substrate and then depositing a magnetic material over the write pole material followed by a non-magnetic material. A first mask is formed having a front edge to define the location of the secondary flare point, and one or more material removal processes are used to remove portions of the magnetic layer and non-magnetic layer that are not protected by this first mask. The first mask is replaced by a second mask that is configured to define a write pole, and an ion milling is performed to define the write pole.

Shadowing from the magnetic layer and non-magnetic layer form a flared secondary flare point. The location of this secondary flare point can advantageously be controlled by the location of the front edge of the first mask.

A non-magnetic gap layer can be deposited over the write pole and magnetic and non-magnetic layers, and a magnetic shield can be plated thereover, such that the magnetic and non-magnetic layers over the write pole form the magnetic shield with a desired stepped feature.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
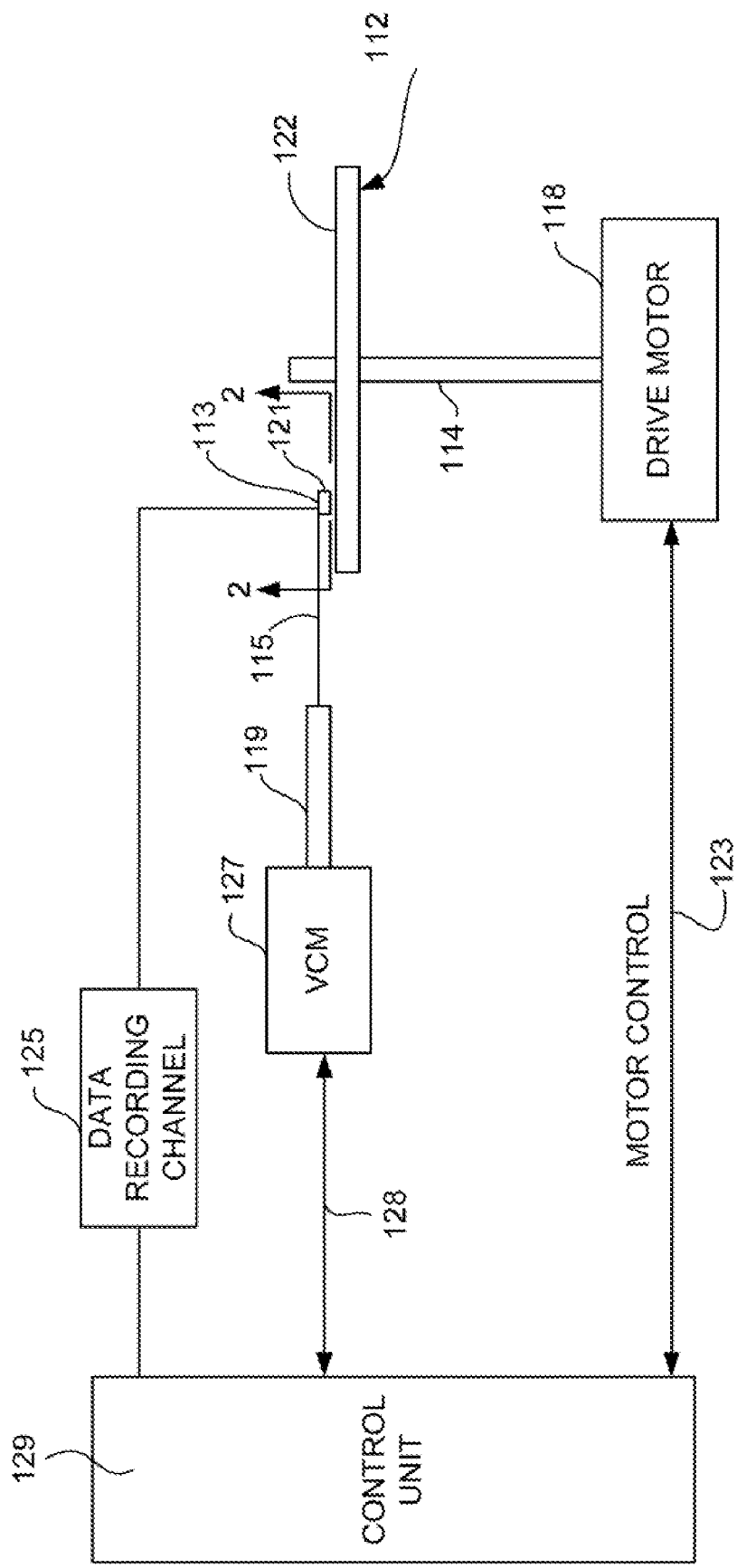
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
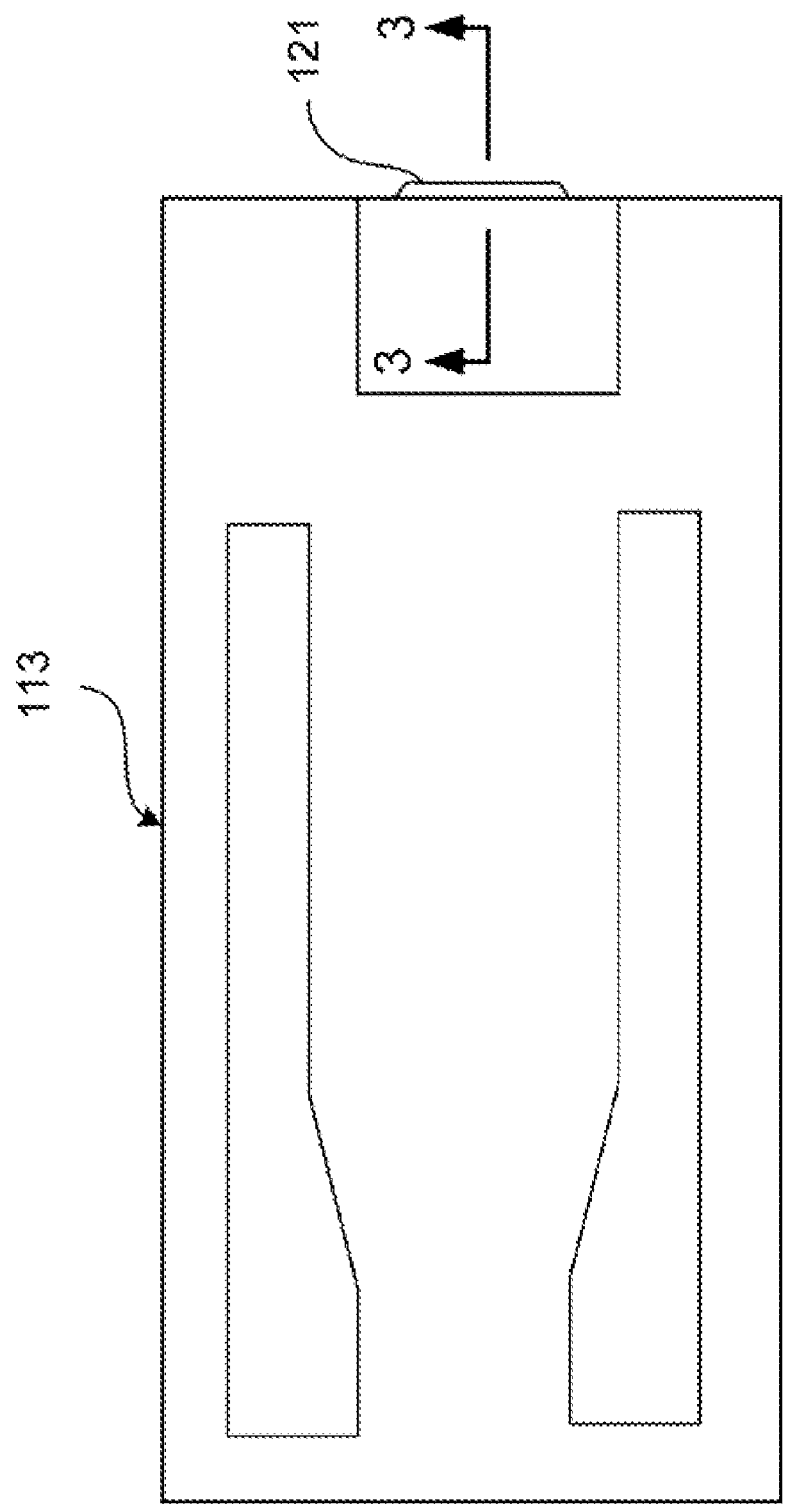
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
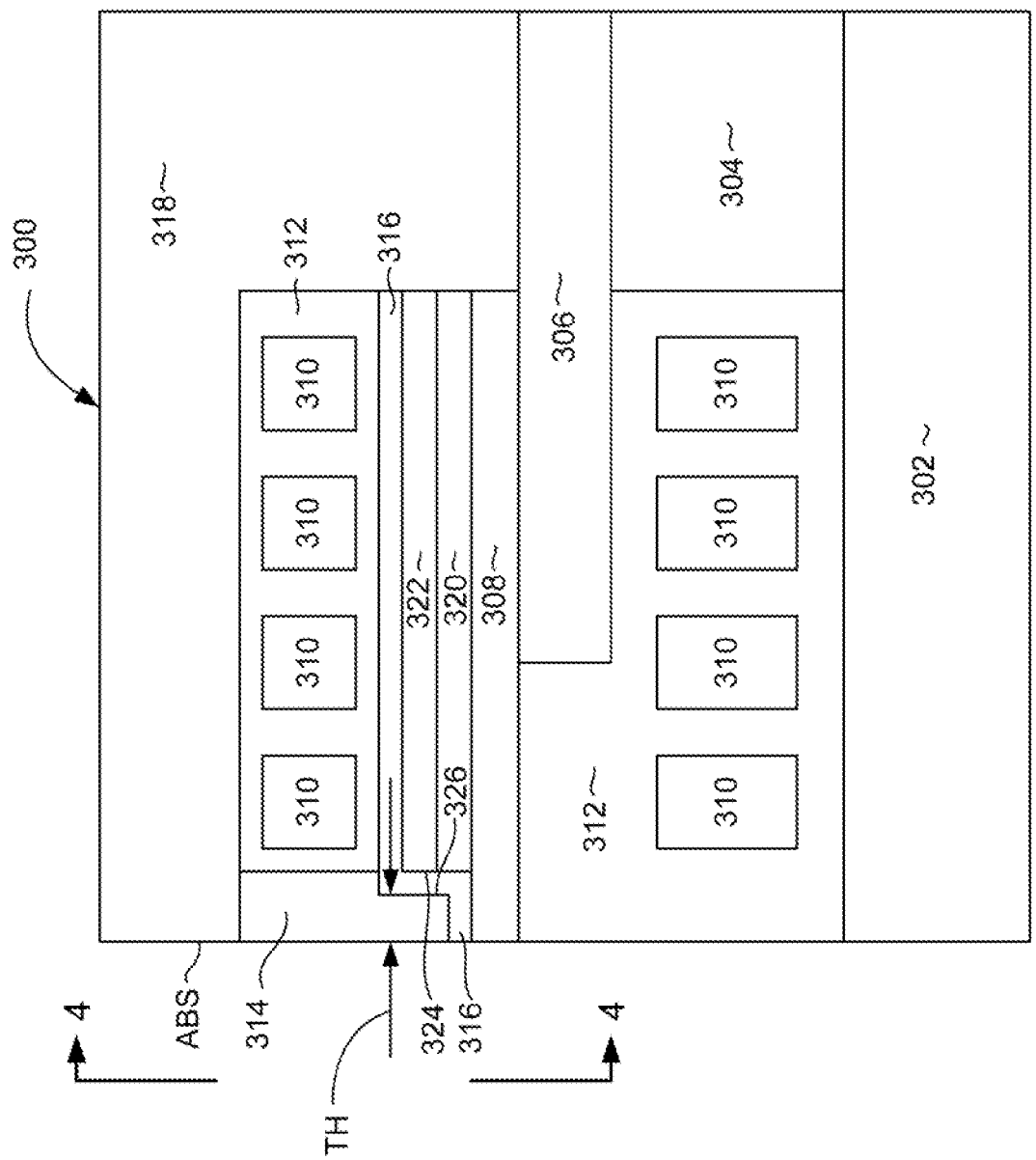
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 300. The write head includes a magnetic return pole 302, and a magnetic back gap layer 304 connected with the return pole 302 in a region removed from the air bearing surface (ABS). A magnetic shaping layer 306 can be connected with the magnetic back gap layer 304, and a magnetic write pole 308 is connected with the shaping layer 306 such that the write pole 308, shaping layer 306, back gap 304 and return pole 302 are all magnetically connected with one another. The write pole 308 has a pole tip that extends to the ABS for emitting a magnetic write field toward a magnetic medium (not shown in FIG. 3). An electrically conductive write coil 310 passes through the write head structure 300, and is embedded in one or more insulation layers 312. The write coil 312 can be configured as one or more pancake coils or can be a helical coil having coil leads that pass above and below the write pole 312 (as shown in FIG. 3).

With continued reference to FIG. 3, the write head 300 can include a trailing magnetic shield 314, located at the ABS, that is separated from the write pole by a trailing gap layer 316. The trailing magnetic shield 314 can be connected with an upper (or trailing) return pole 318 that can magnetically connect the trailing magnetic shield 314 with the shaping layer 306, back gap 304 and return pole 302 in a region removed from the ABS. The trailing magnetic shield increases writing speed by increasing the field gradient of the write field. To achieve this end, the thickness of the trailing gap 316 must be well controlled. If the trailing gap 316 is too large, the write field will not be increased and write speed will suffer. If the trailing gap is too small, too much flux will leak to the trailing shield 314 and the strength of the write field will suffer.

Similarly, another parameter that must be carefully controlled is the trailing shield throat height TH. The head 300 has a magnetic layer 320 formed over a portion of the write pole 308, and a non-magnetic spacer layer 322 can be formed over the magnetic layer 320. The layers 320 and 322 have a common front edge 324 located a desired distance from the ABS.

The trailing magnetic shield 314 has a throat height TH that is the distance from the ABS to a back edge 326 of the trailing shield 314. The write pole 308 has a flare point (not shown in FIG. 3) that is located at the location of the front edge 324 of the layers 320, 322. As can be seen, then, the location of the back edge 326 of the trailing shield is determined by the location of the front edge 324 of layers 320, 322 and also by the thickness of the trailing gap layer 316. This advantageously allows the throat height TH of the trailing shield 314 to be located relative to the flare point of the write pole 308.

Figure 4:
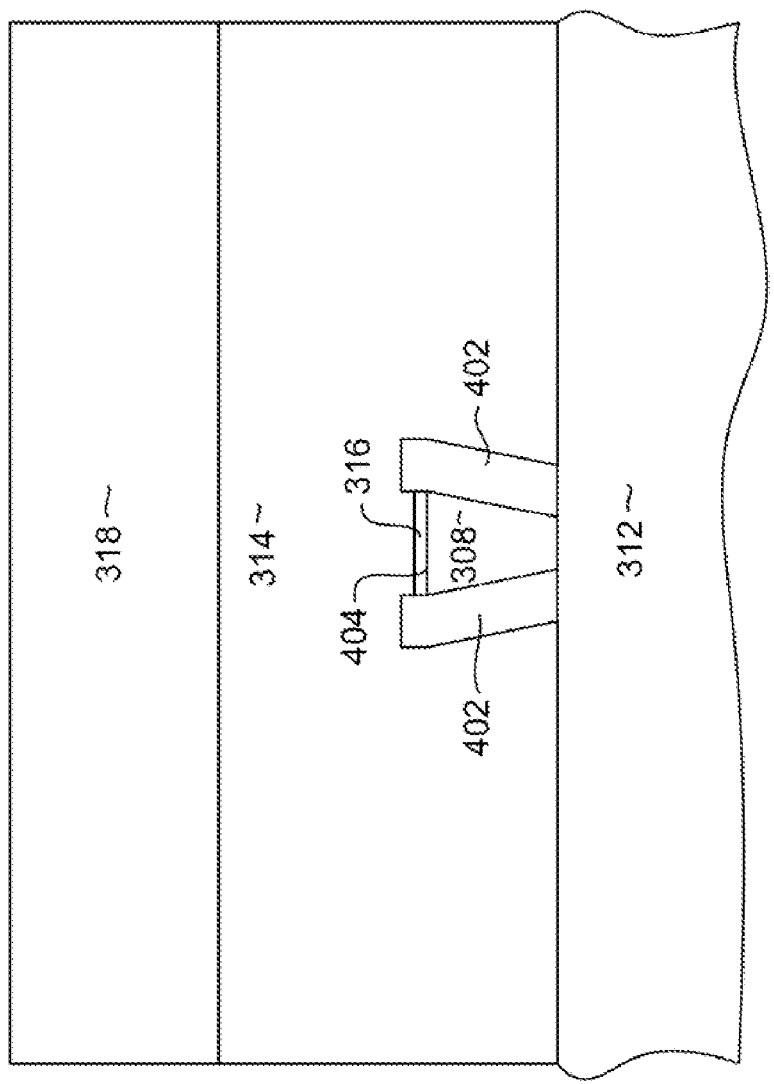
FIG. 4 is an ABS view of a portion of the write head of FIG. 3.

With reference now to FIG. 4, which shows an ABS view of a portion of the write head 300, the write pole has a trapezoidal shape at the ABS. In addition, the trailing shield 314 wraps around the sides of the write pole 308, the trailing magnetic shield being separated from the sides of the write pole by first and second non-magnetic side gap layers 402. The side gap layers preferably extend upward beyond the leading edge 404 of the write pole and even beyond the trailing gap layer 316.

Figure 5:
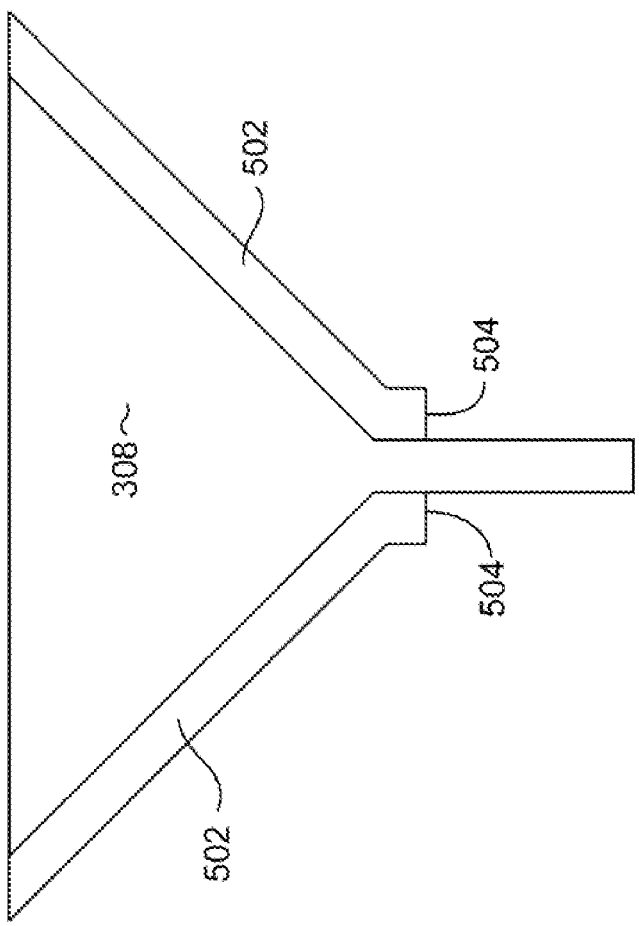
FIG. 5 is a top down view of a write pole of the write head of FIG. 3.

FIG. 5 shows a top down view of the write pole 308. The write pole 308 has outward extending stepped portions 502 that define a secondary flare point that can easily be located relative to the ABS. The outward extending stepped portions 502 each have a front edge 504 that defines the location of the flare point, and this location is self aligned with the front edge 324 of layers 320, 322 described above with reference to FIG. 3. The reason for this self alignment and the specific configuration of the outward extending stepped portions 502 will become clearer after reading the descriptions below of methods for manufacturing a write head according to an embodiment of the invention.

Figure 6:
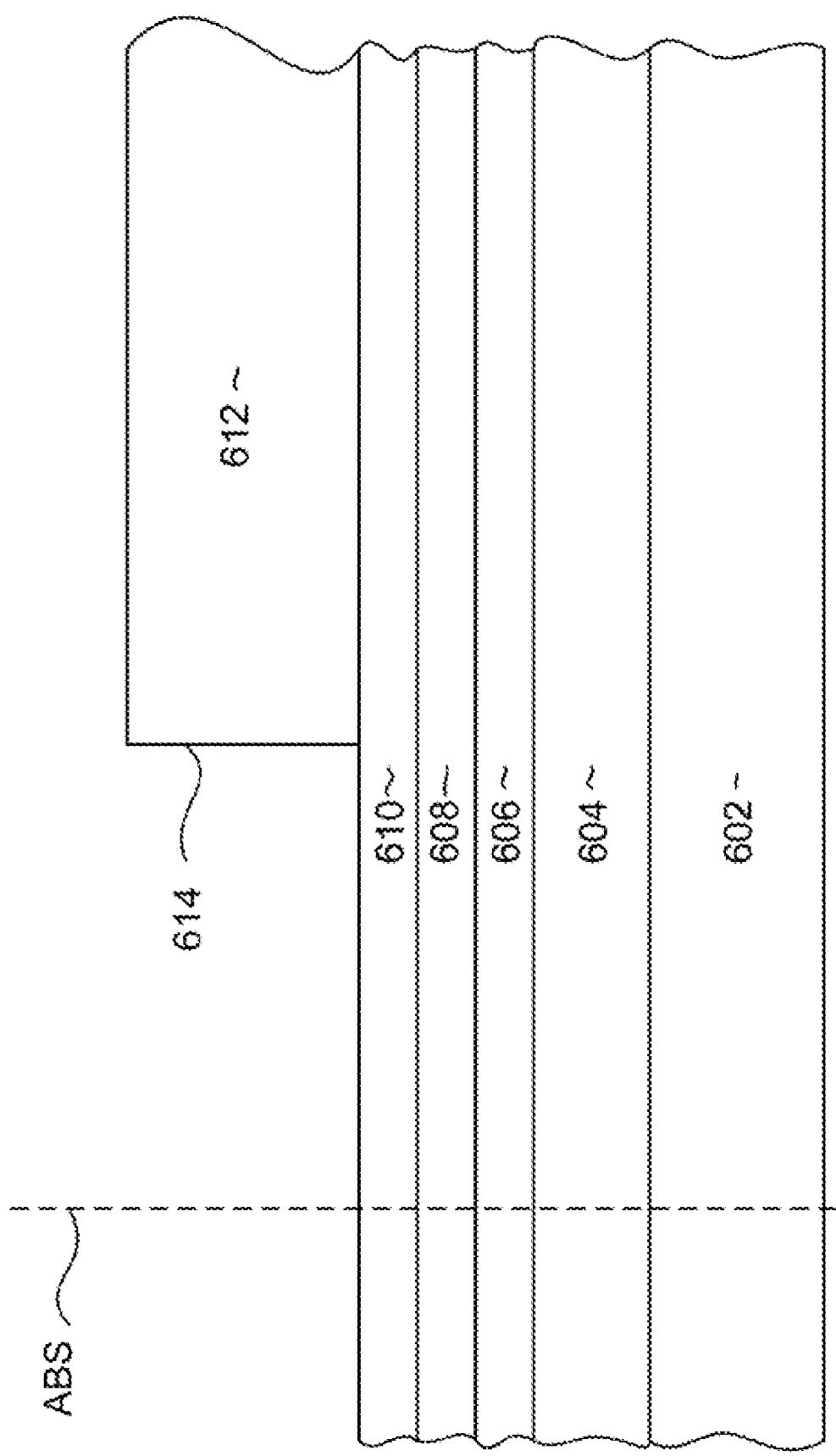
FIGS. 6-19 are views of a write head in various intermediate stages of manufacture illustrating method for manufacturing a write head according to an embodiment of the invention.

With reference now to FIGS. 6-19, a method for manufacturing a magnetic write head according to an embodiment of the invention is described. With particular reference to FIG. 6, a substrate 602 is provided. The substrate 602 can include, for example, the insulation layer 312 and all or a portion of the shaping layer 306 described above with reference to FIG. 3. A layer of magnetic write pole material 604 is deposited full film over the substrate. The magnetic write pole material is preferably a lamination of magnetic layers separated by thin layers of non-magnetic material, and will be referred to herein as a laminate 604. However, it should be understood that the write pole material 604 could be constructed as one or more layers of magnetic material without any lamination of non-magnetic layers.

With continued reference to FIG. 6, a magnetic layer 606 such as a layer of CoFe is deposited over the laminate 604, and a non-magnetic spacer layer 608 is deposited over the magnetic layer 608. The magnetic layer 606 can be deposited to a thickness of about 30-70 nm, and the non-magnetic spacer layer 608 can be deposited to a thickness of about 40-80 nm. The non-magnetic spacer layer 608 is preferably constructed of a material such as $SiO_2$ or SiN. An image transfer layer 610 is then, deposited over the spacer layer 608. The image transfer layer 610 can be constructed of a polyimide material such as DURAMIDE®, or some similar material.

A mask layer 612 is then formed over the layers 602-610. The mask 612 can be formed by depositing a photoresist and then photolithographically patterning and developing the photoresist. The mask 612 has a front edge 614 that is located a desired distance from an intended air bearing surface plane, denoted by dashed line ABS in FIG. 6.

Figure 7:
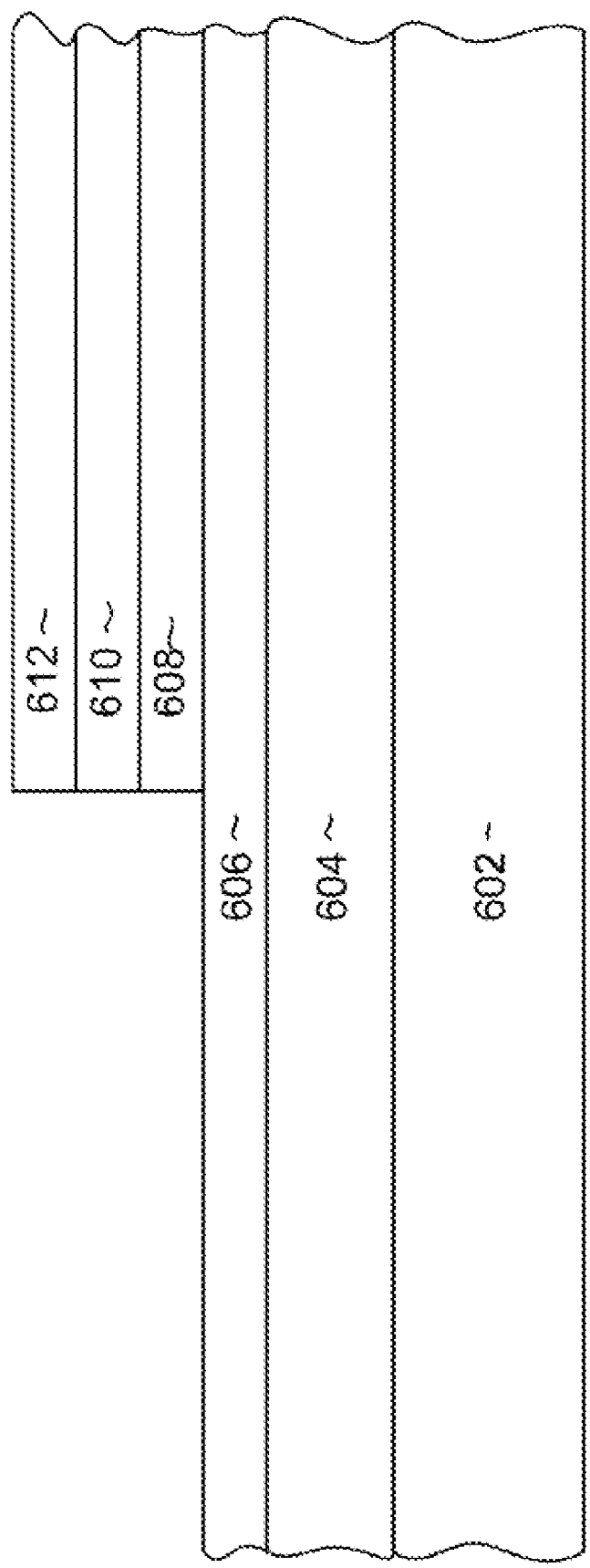
Figure 8:
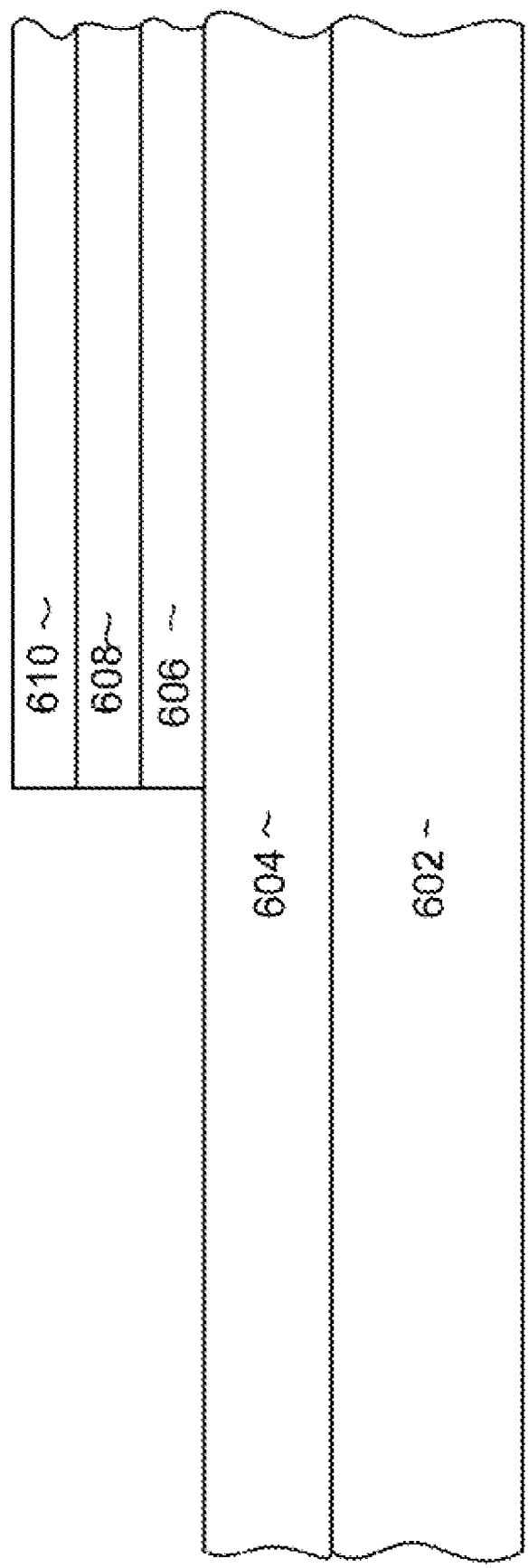

With reference now to FIG. 7, one or more reactive ion etching processes (RIE) are performed to remove portions of the image transfer layer 610 and spacer layer 608 that are not protected by the mask 612. The RIE is stopped when the magnetic layer 606 is reached. Then, with reference to FIG. 8, an ion milling is performed to remove portions of the magnetic layer 606 that are not protected by the layers 608, 610, 612. Ion milling is terminated when the laminate layer 604 is reached. An end point detection method such as Secondary Ion Mass Spectroscopy (SIMS) can be used to determine when the laminate 604 has been reached. A thin end point detection layer (not shown) could be included at the top of the laminate 604 in order to assist SIMS end point detection. The remaining image transfer layer 610 and any remaining mask layer 612 (FIG. 7), if any remains, can be lifted off.

Figure 9:
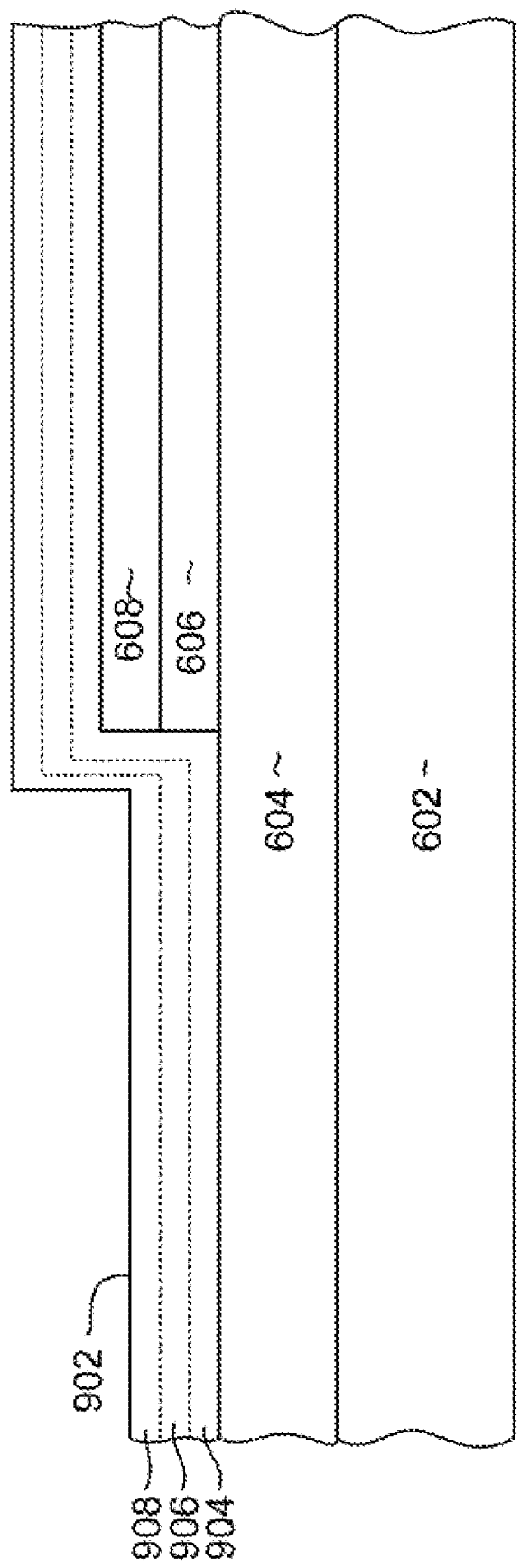

With reference to FIG. 9, a hard mask layer 902 can be deposited over the laminate and over the magnetic layer 606 and spacer layer 608. The hard mask layer 902 is preferably a laminate structure that includes a first layer 904, a second layer 906 deposited over the first layer 904 and a third layer 908 deposited over the second layer 906. The first layer is preferably alumina ($Al_2O_3$) deposited to a thickness of 15-25 nm or about 20 nm. The second layer 906 is preferably a material that can be easily removed by reactive ion etch (RIE). Therefore, the second layer 906 can be a material such as SiN or $SiO_2$ and can be deposited to a thickness of 25-35 nm or about 30 nm. The third layer is preferably a material that can be detected by an end point detection method such as Secondary Ion Mass Spectroscopy (SIMS). Layer 908 can be AlTiO deposited to a thickness of 15-25 nm or about 20 nm. The layers 904, 906, 908 can be deposited by a deposition method such as putter deposition that deposits the horizontally disposed surfaces at a rate about 3 times the rate at which vertically disposed surfaces are deposited. Therefore, the total thickness of the hard mask layer 902 can have a thickness of about 55-85 nm or about 70 nm, having a vertically extending portion 910 (at the front edge of the layers 606, 608) that has a thickness about ⅓ the thickness of the rest of the hard mask layer 602. In other words the vertical portion 910 of the hard mask layer 902 can have a thickness of about 18 to 28 nm or about 23 nm.

Figure 10:
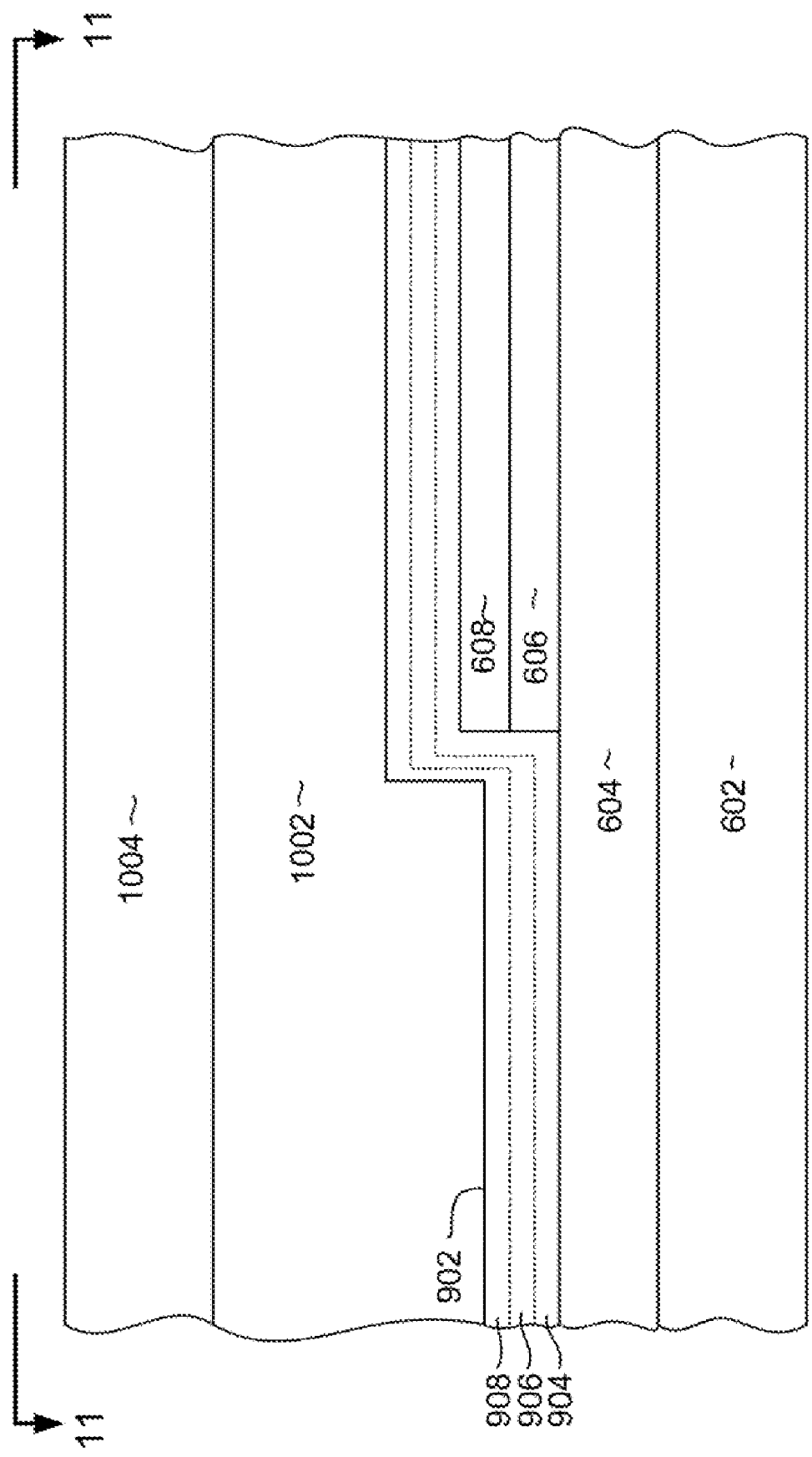
Figure 11:
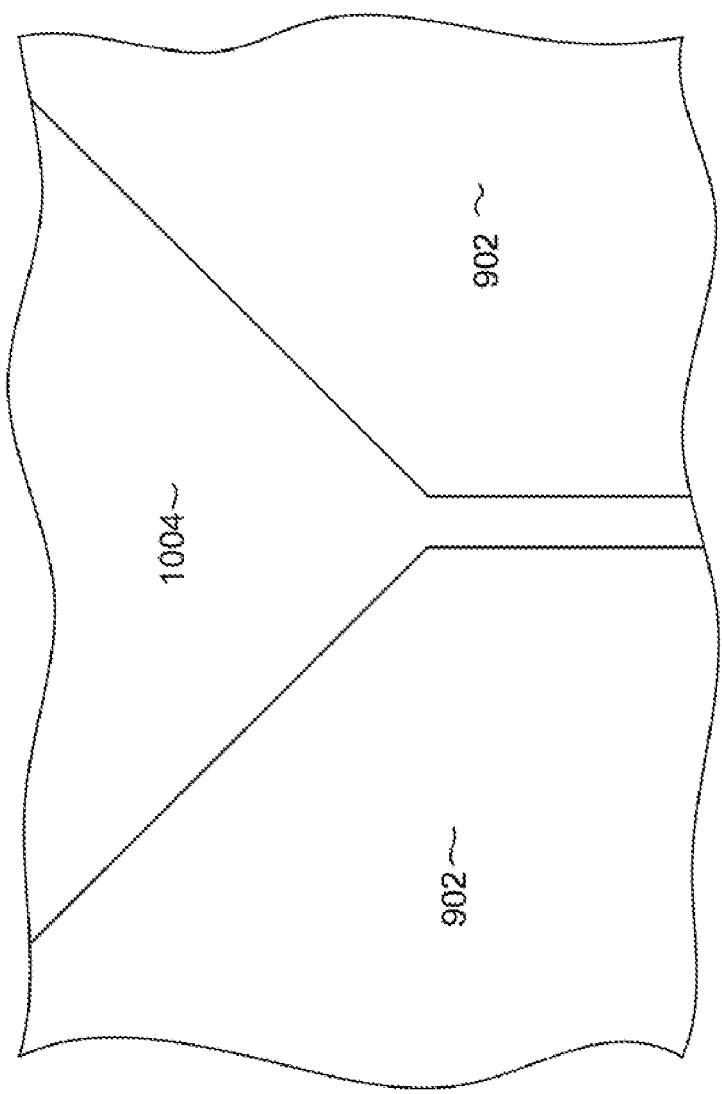

With reference now to FIG. 10, an image transfer layer 1002 is deposited followed by a photoresist layer 1004. The image transfer layer 1002 can be a polyimide material such as DURMIDE® and can be deposited to a thickness of about 1.2 um. With reference now to FIG. 11, the photoresist is photolithographically patterned to have a shape configured to define a write pole. An image transfer process such as Reactive Ion Etching (RIE) can then be performed to transfer the image of the photoresist layer 1004 onto the underlying image transfer layer 1002 (FIG. 10). As seen in FIG. 11, this reveals the hard mask 902 thereunder.

Figure 12:
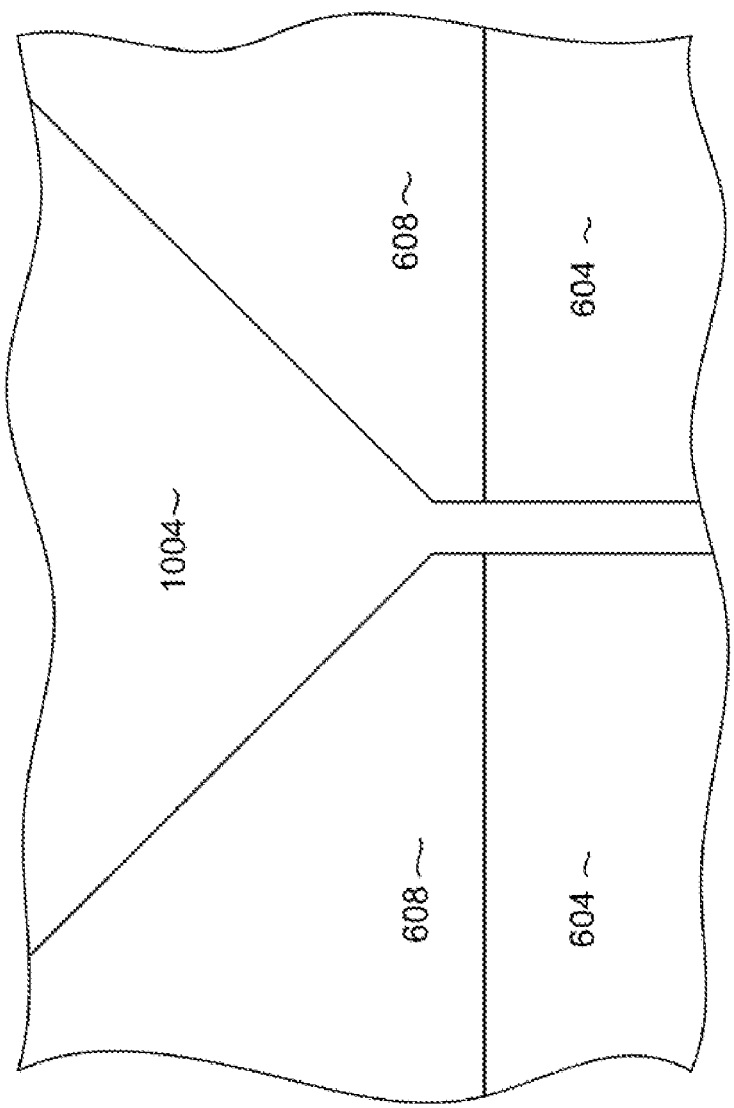
Figure 13:
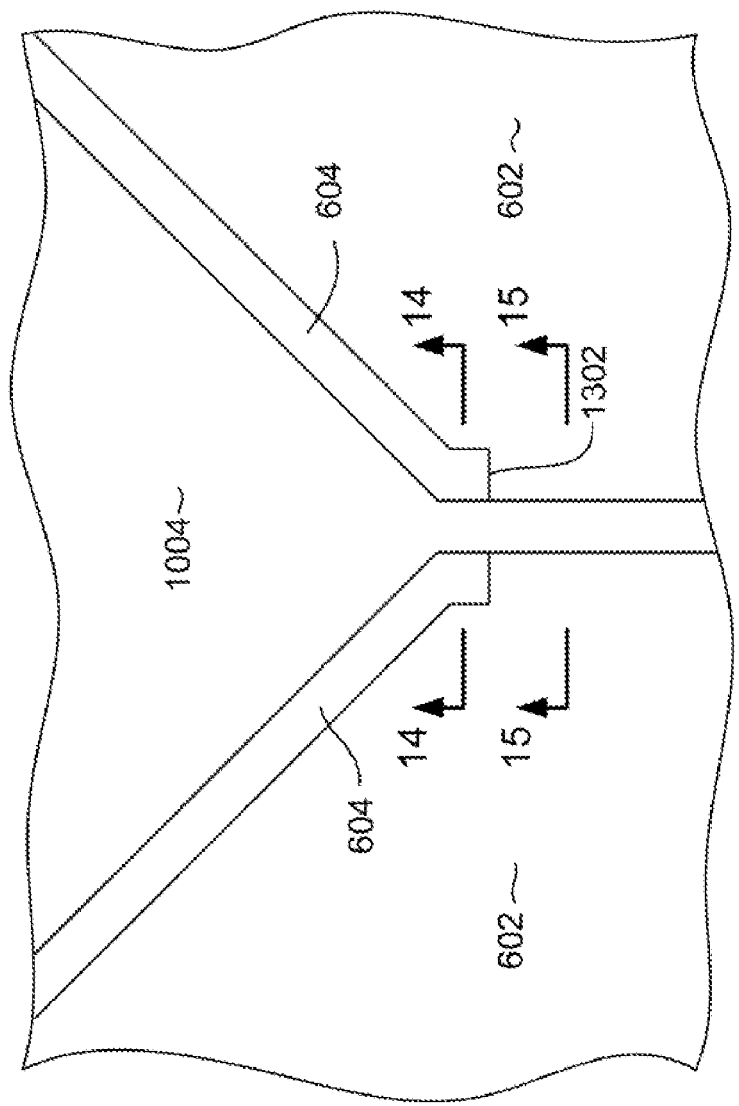
Figure 14:
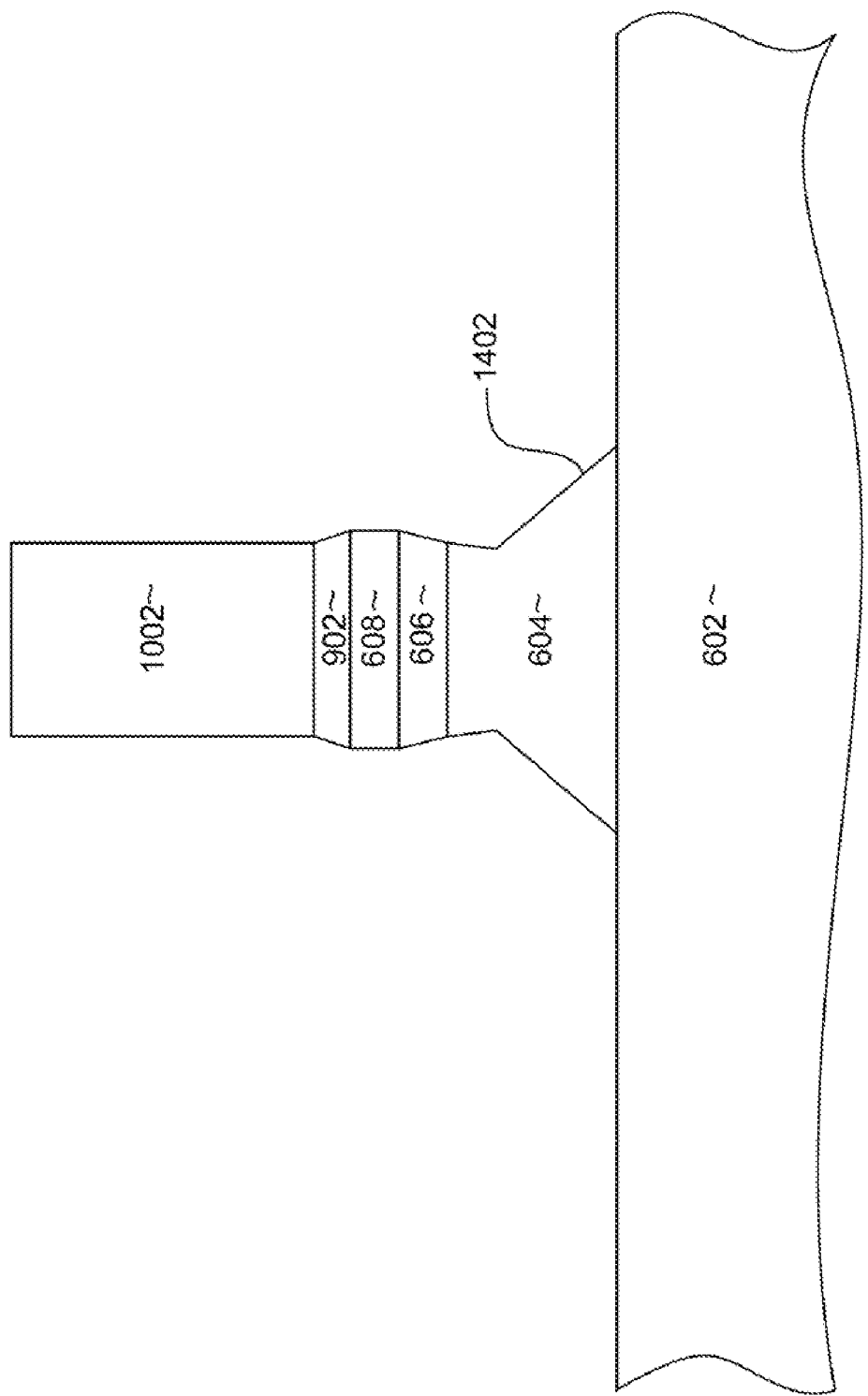
Figure 15:
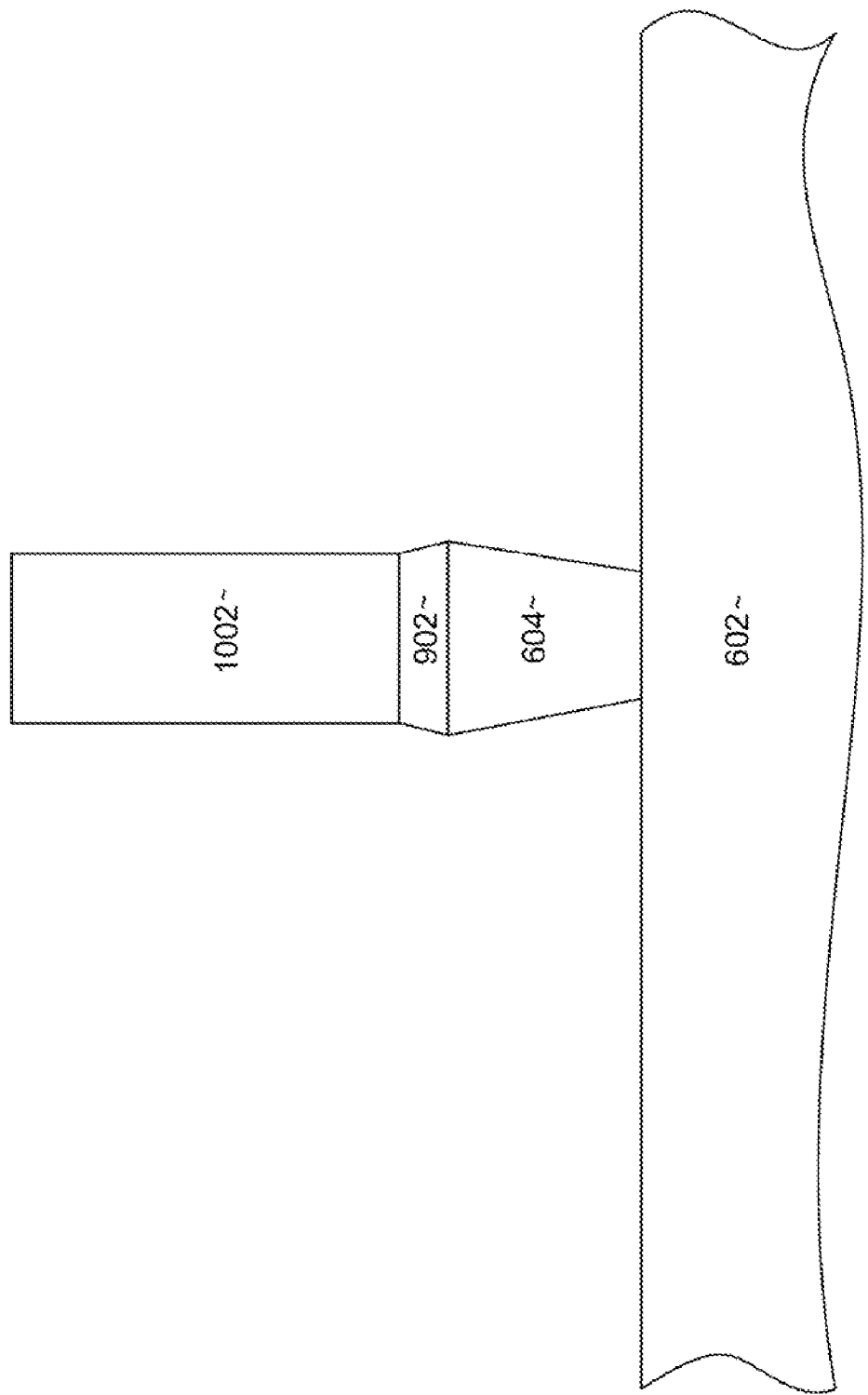

Then, with reference to FIG. 12, a Reactive Ion Milling (RIM) is performed to remove portions of the hard mask layer 902 (FIG. 10) that are not protected by the mask 1004 and image transfer layer 1002. As can be seen in FIG. 12, this reveals the non-magnetic spacer 608 and the laminate 604. Then, with reference to FIGS. 13-15, an ion milling is performed to remove portions of the laminate 604 that are not protected by the mask structure 1004. FIG. 14 shows a cross section as viewed from line 14-14 of FIG. 13. As can be seen in FIG. 14, the portions of the laminate 604 that are under the magnetic layer 606 and non-magnetic spacer layer 608 are under-milled, having an outward sloping base 1402. This under-milling is due to shadowing from the extra height provided by the magnetic layer 606 and non-magnetic spacer 608. This can be compared with the view shown in FIG. 15 (which is viewed from line 15-15 of FIG. 13), wherein it can be seen that the laminate tapers to form a trapezoidal shaped magnetic write pole tip. Therefore, the portion of the laminate 604 that is under the magnetic layer 606 and 608 extends outward to form a secondary flare point 1302 as can be seen with reference to FIG. 13. The remaining image transfer layer 1002 can then be lifted off, such as by TMAH etch plus NMP and Reactive Ion Etch).

Figure 16:
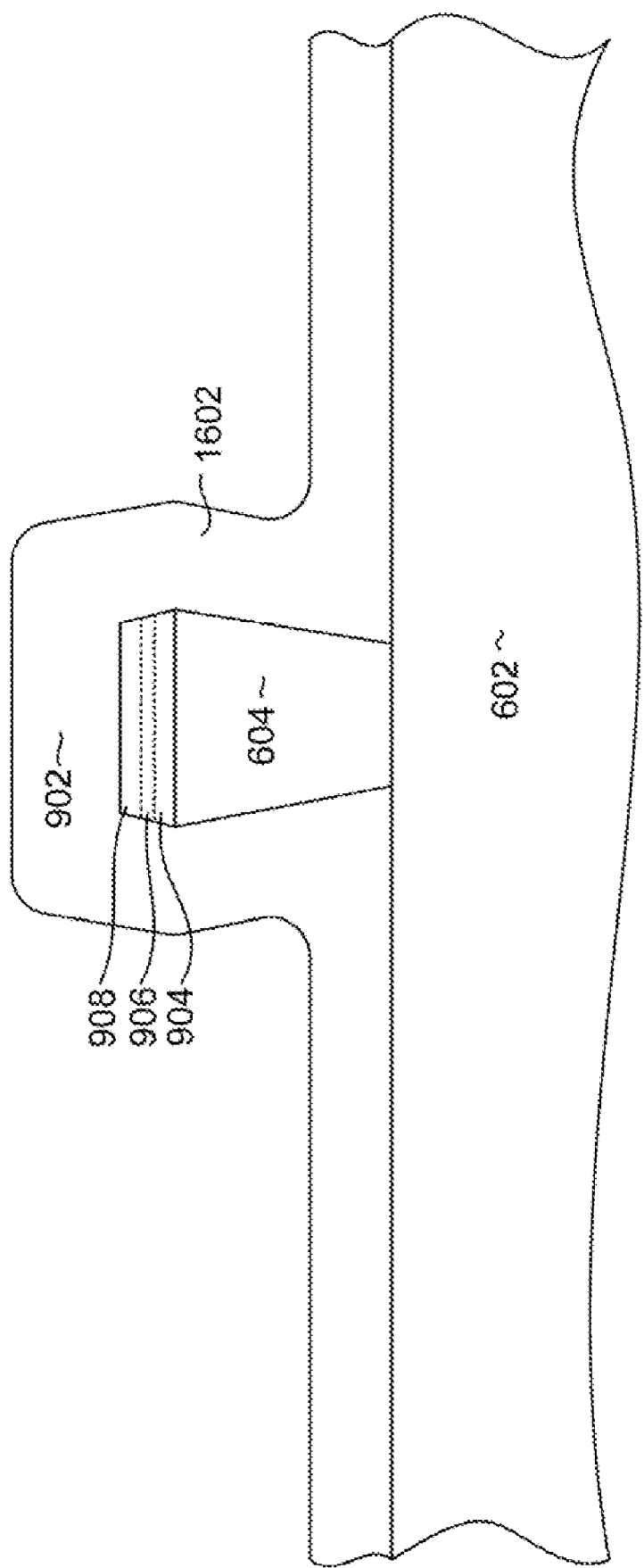
Figure 17:
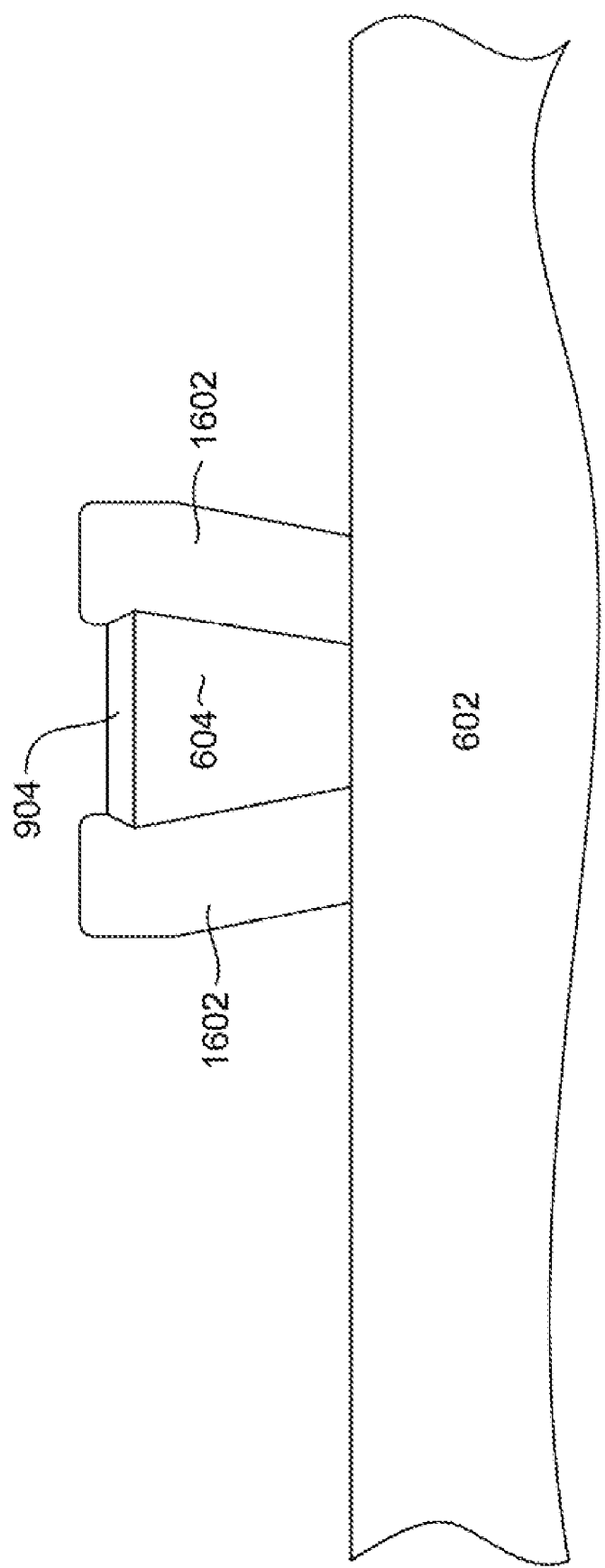

With reference now to FIG. 16, a layer of non-magnetic material 1602 is conformally deposited. The layer 1602 is preferably alumina ($Al_2O_3$) deposited by a method such as atomic layer deposition (ALD) or chemical vapor deposition (CVD). Then, another ion milling can be performed to preferentially remove horizontally disposed portions of the non-magnetic layer 1602, resulting in non-magnetic sidewalls (side gap layers) 1602 being formed at either side of the write pole. This ion milling is preferably performed at an angle of about 55 degrees relative to normal. As will be remembered from above, the hard mask layer 902 includes first, second and third layers 904, 906, 908. The ion milling is performed sufficiently to remove the third layer 908 using Ti for endpoint detection, such as by SIMS. A reactive ion etching can be performed to remove the SiN second layer 906 leaving the first layer 904 as shown in FIG. 17. The remaining hard mask layer 904 serves as a trailing gap layer, and the non-magnetic side walls 1602 serve as first and second non-magnetic side gaps.

Figure 18:
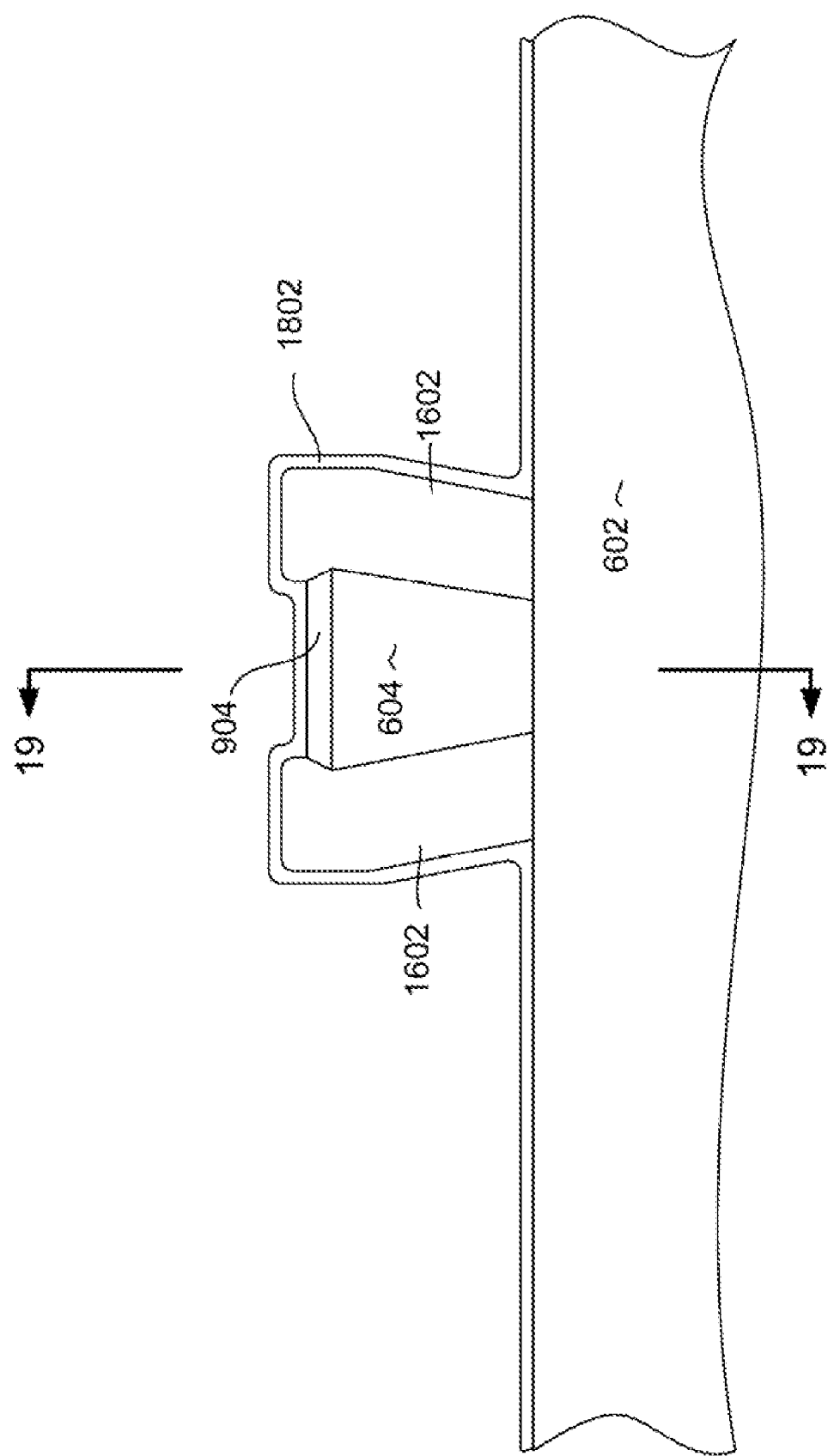
Figure 19:
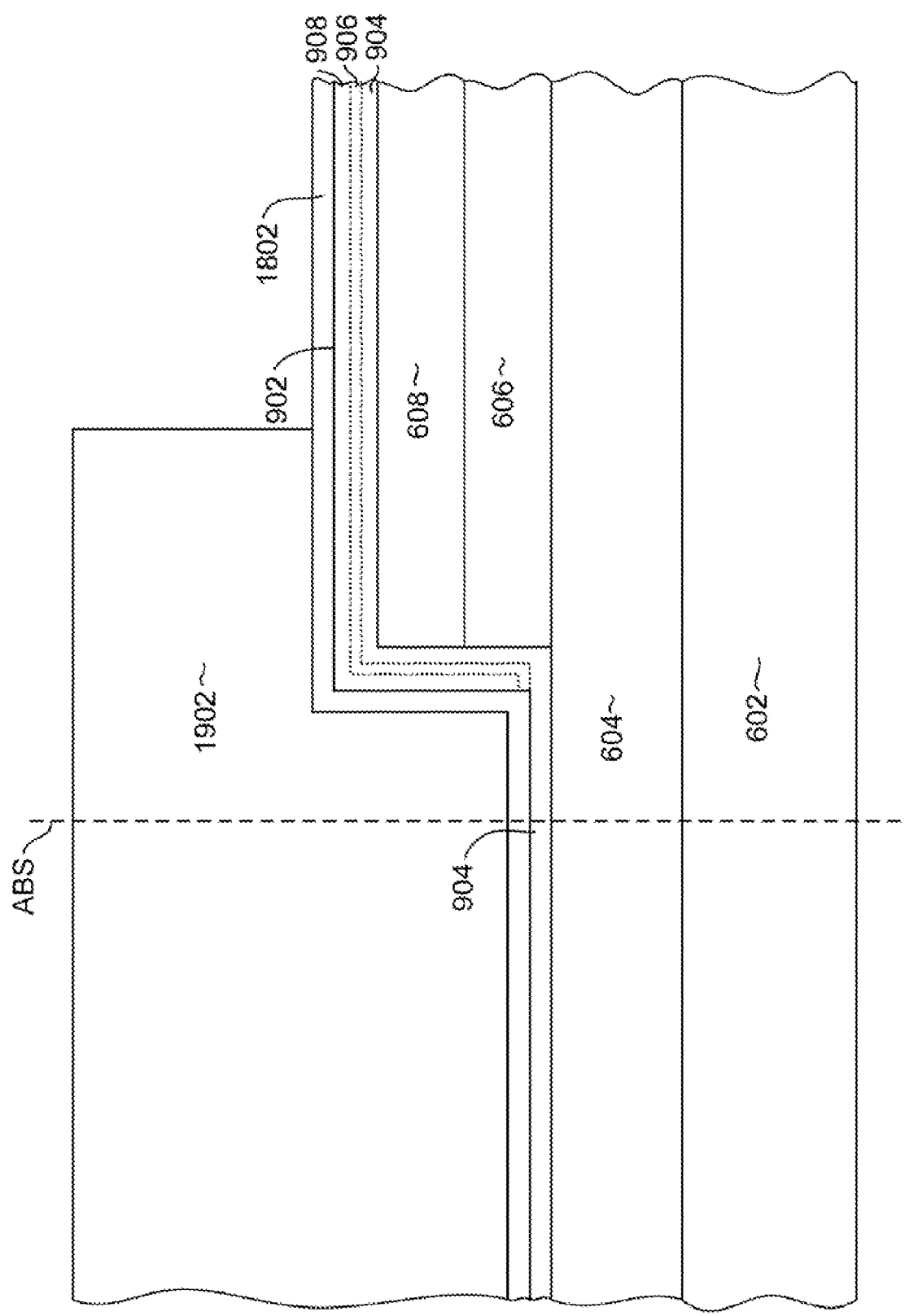

With reference now to FIG. 18, an electrically conductive (preferably magnetic) seed layer 1802 such as Rh is deposited full film. Then, with reference to FIG. 19, (which shows a side cross section taken from line 19-19 of FIG. 18) a masking and electroplating process can be performed to deposit a magnetic material to form a trailing magnetic shield 1902. As seen in FIG. 19, the trailing, wrap around, magnetic shield 1902 has a throat height TH measured from an intended ABS plane that is defined by the location of the front edge of the layers 606, 608 and by the thickness of the hard mask layers 902 (including all three layers 904, 906, 908). As will be recalled with reference to FIG. 13, the location of the secondary flare write head flare point 1302 is aligned with the front edge of the layers 606, 608. Therefore, the spacing between the trailing shield 1902 (FIG. 19) and the flare point 1302 is determined by the thickness of the layers 902 (including layers 904, 906 and 908). As those skilled in the art will appreciate, the ABS will be defined by a lapping operation that removes material from the left side of the page as shown in FIG. 19, stopping the lapping at the intended ABS plane indicated by the dashed line denoted "ABS".

Figure 20:
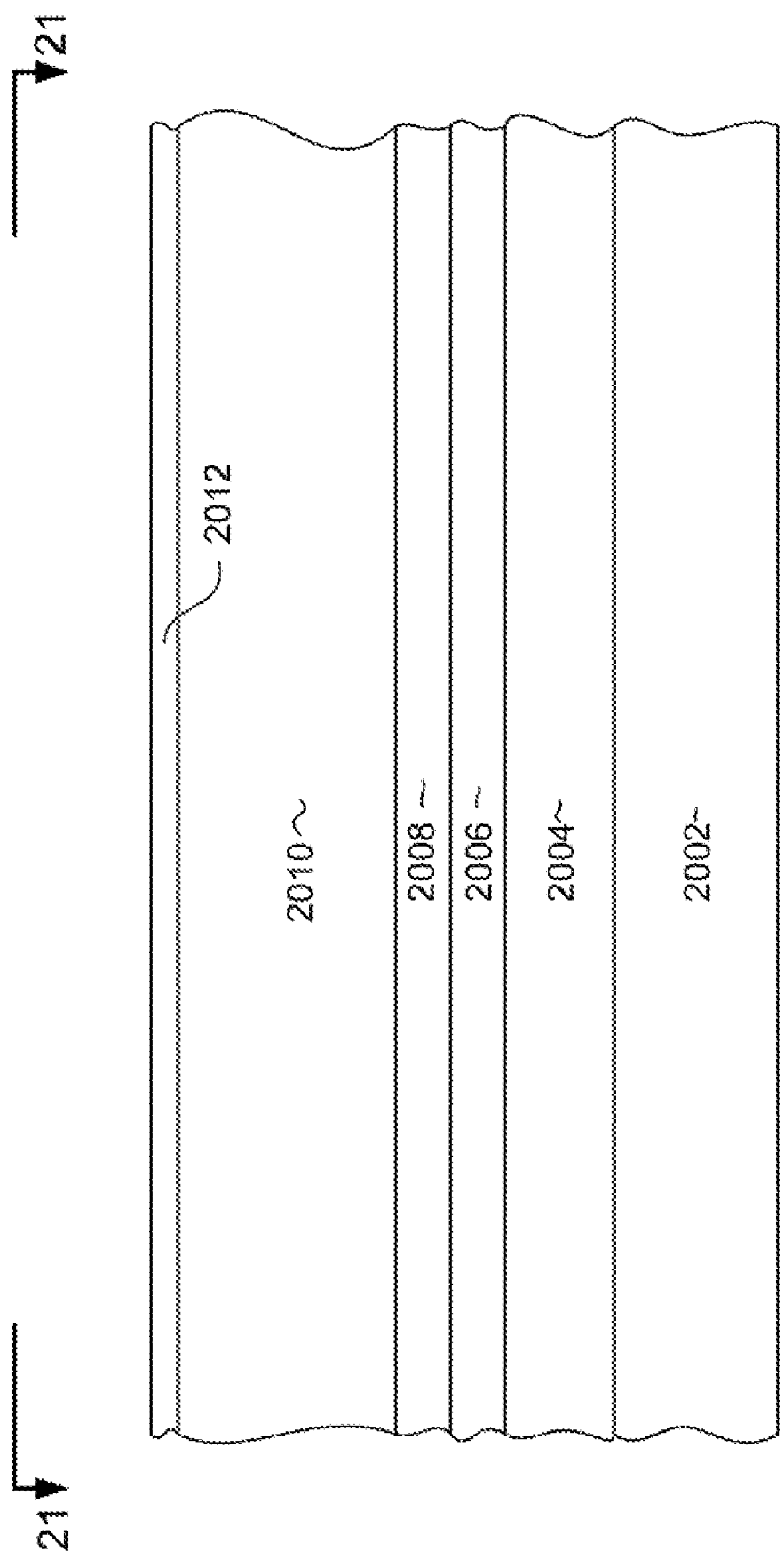
FIGS. 20-35 are views of a write head in various intermediate stages of manufacture illustrating a method of manufacturing a write head according to an alternate embodiment of the invention.

With reference now to FIGS. 20-35 another method for constructing a magnetic write head according to an embodiment of the invention is disclosed. With particular reference to FIG. 20, a substrate 2002 is provided. A laminate 2004 is deposited over the substrate. Then, a magnetic layer such as CoFe 2006 having a thickness of 30-70 nm or about 50 nm is deposited over the laminate 2004. Then, a non-magnetic layer 2008 (preferably Rh Ir or Ru) is deposited over the magnetic layer 2006. The non-magnetic layer can have a thickness of 40-80 nm or about 60 nm. An image transfer layer 2010, constructed of a polyimide material such as DURMIDE® is deposited over the non-magnetic spacer layer 2008, and a layer of photoresist 2012 is deposited over the image transfer layer 2010.

Figure 21:
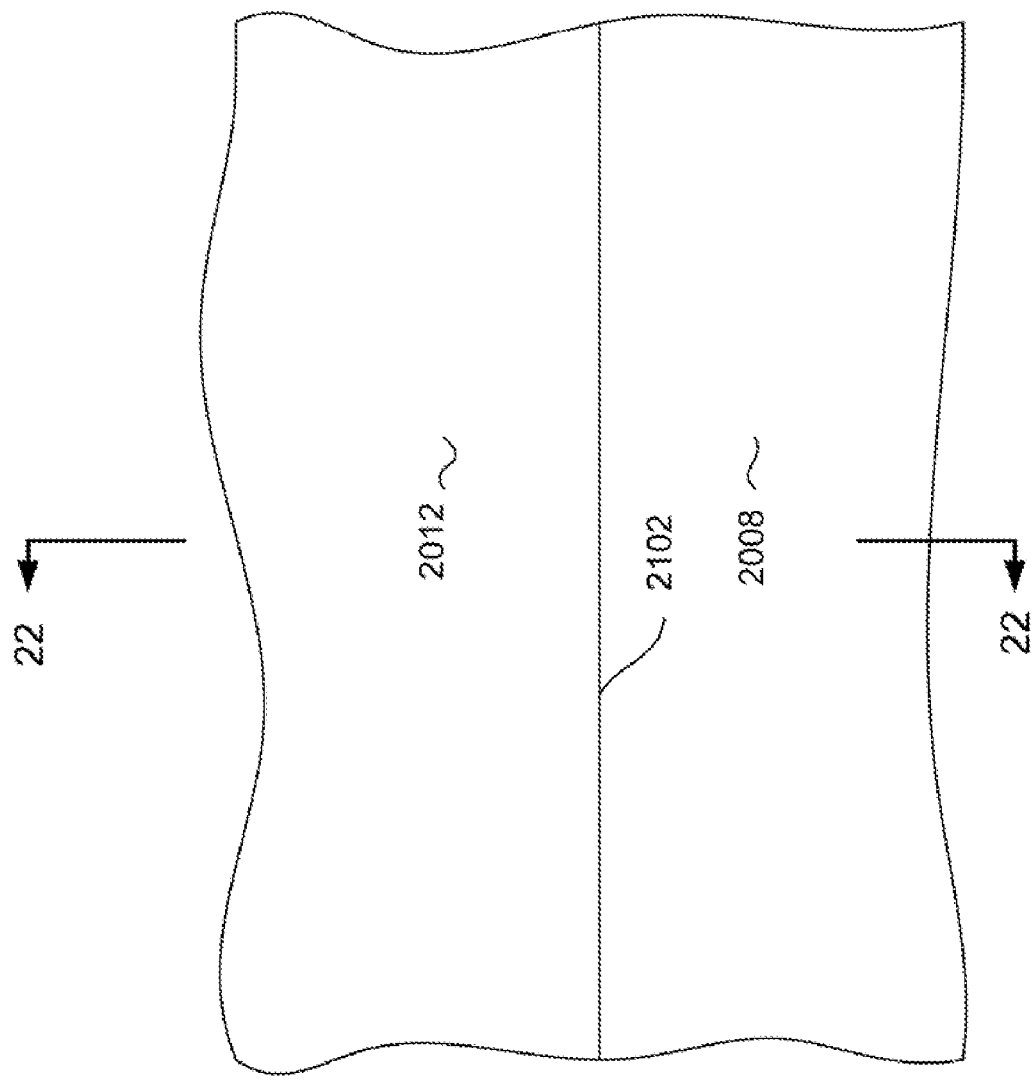
Figure 22:
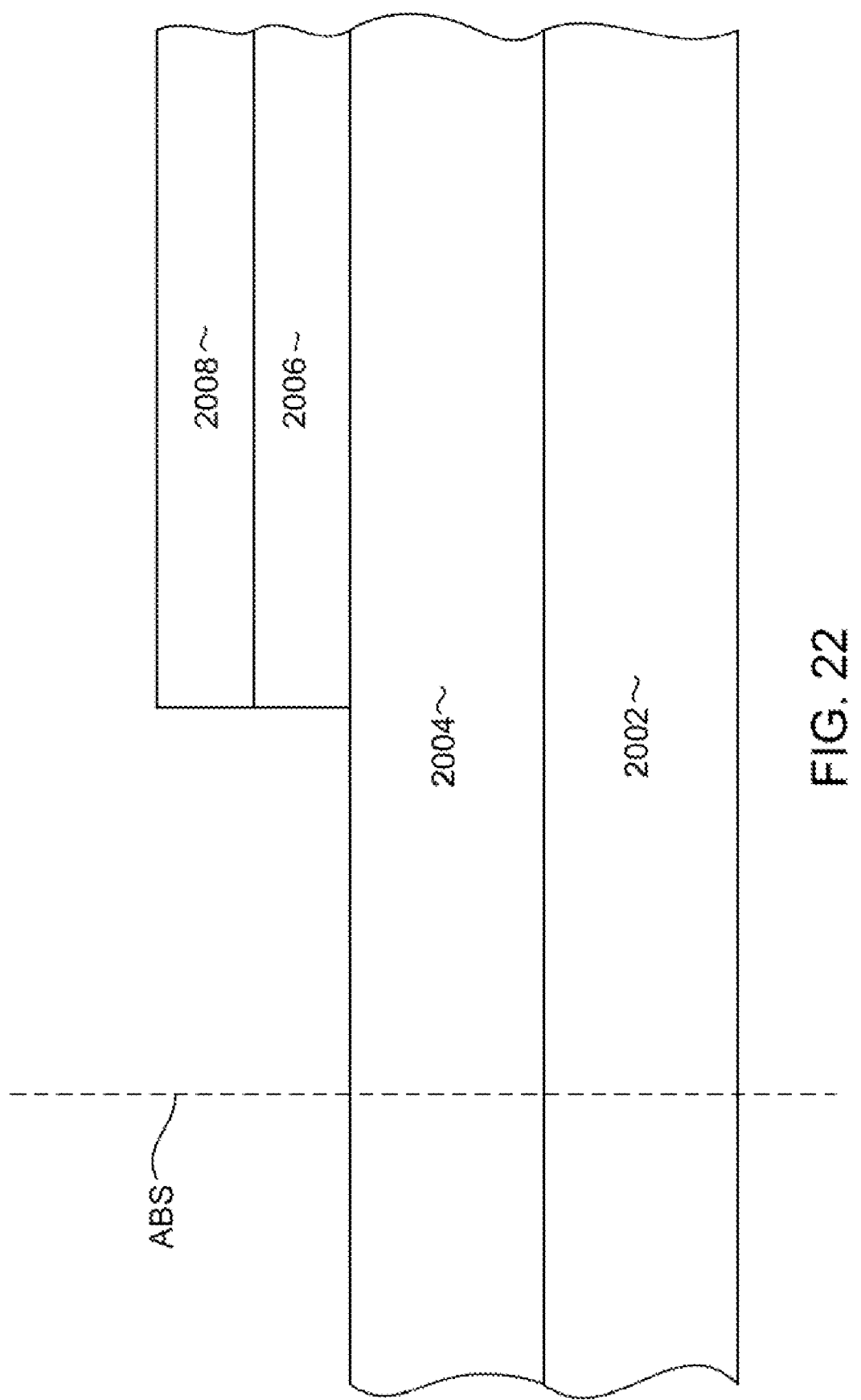

With reference now to FIG. 21 (which shows a top down view as viewed from the line 21-21 of FIG. 20) the photoresist 2012 is photolithographically patterned and the image of the photoresist layer 2012 is transferred onto the underlying image transfer layer 2010 (FIG. 20) to reveal a portion of the non-magnetic spacer layer 2008. This forms a mask 2012 having a front edge 2102 at a location where a secondary write pole flare point will be located. An ion milling is performed to remove portions of the magnetic layer 2006 and non-magnetic spacer layer 2008 that are not protected by the mask 2012. The mask 2012 can then be lifted off, leaving a structure as shown in FIG. 22. FIG. 22 shows a side, cross sectional view taken from the line 22-22 of FIG. 21.

Figure 23:
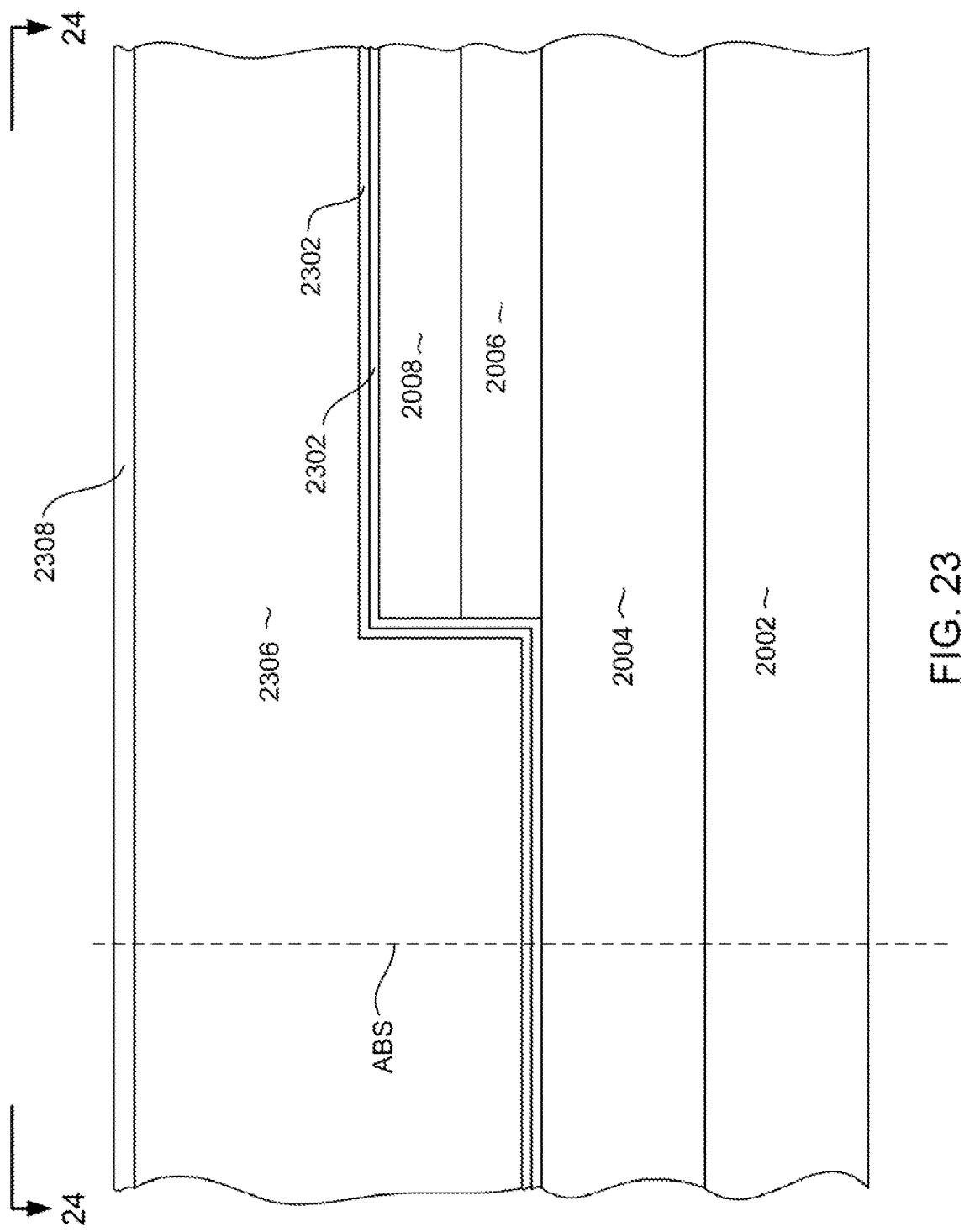
Figure 24:
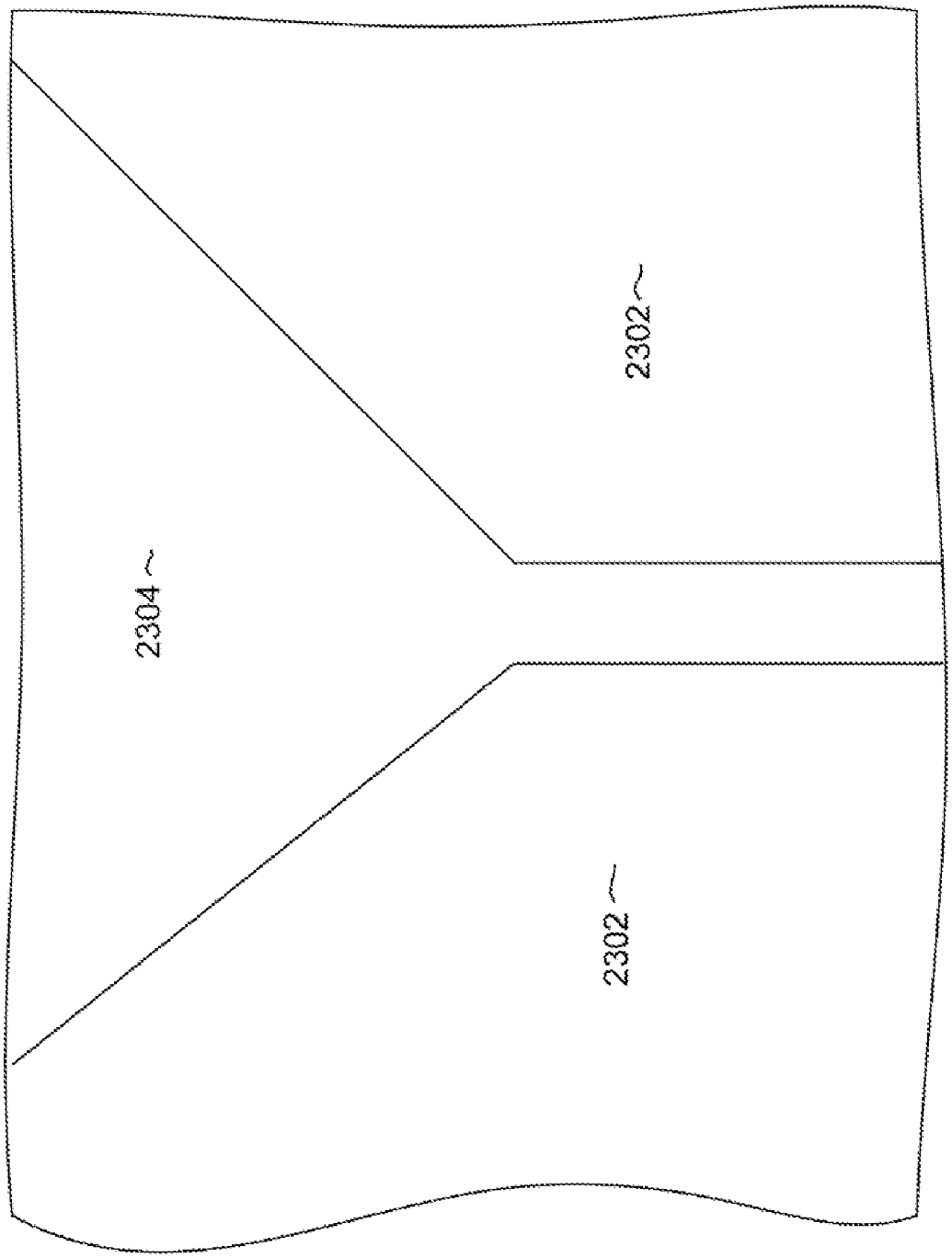

With reference now to FIG. 23, a thin alumina mask layer 2302 is deposited full film to a thickness of 5-15 nm or about 10 nm. A layer of material that is resistant to chemical mechanical polishing (CMP stop layer) 2304 is deposited over the thin alumina mask 2302. The CMP stop layer 2304 can be a material such as diamond like carbon (DLC) and can be deposited to a thickness of 15-25 nm or about 20 nm. An image transfer layer such as DURAMIDE® 2306 is deposited relatively thick (such as to a thickness of about 1000- 1400 nm or about 1200 nm. A layer of photoresist 2308 is deposited over the image transfer layer 2306.

Figure 25:
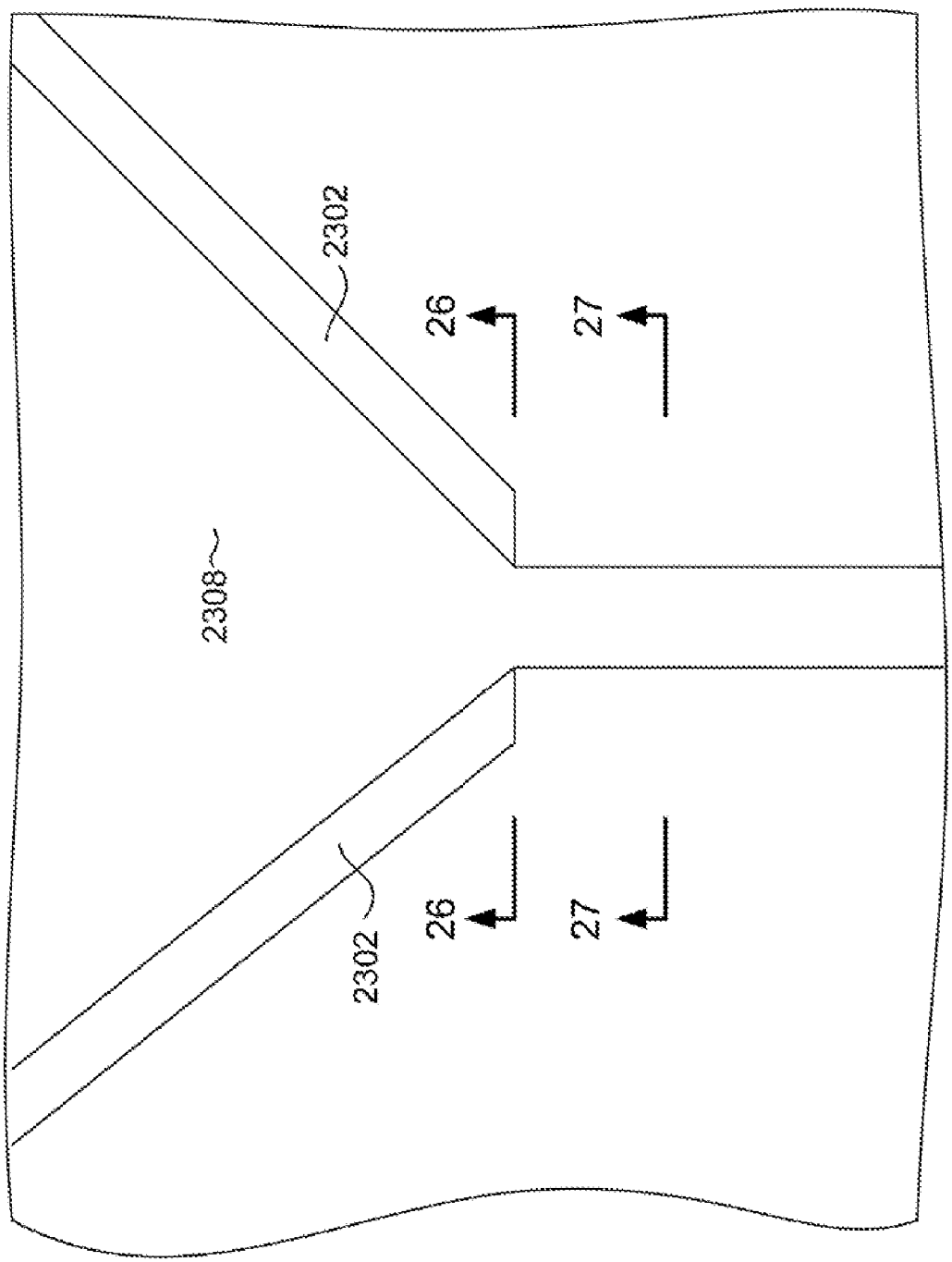
Figure 26:
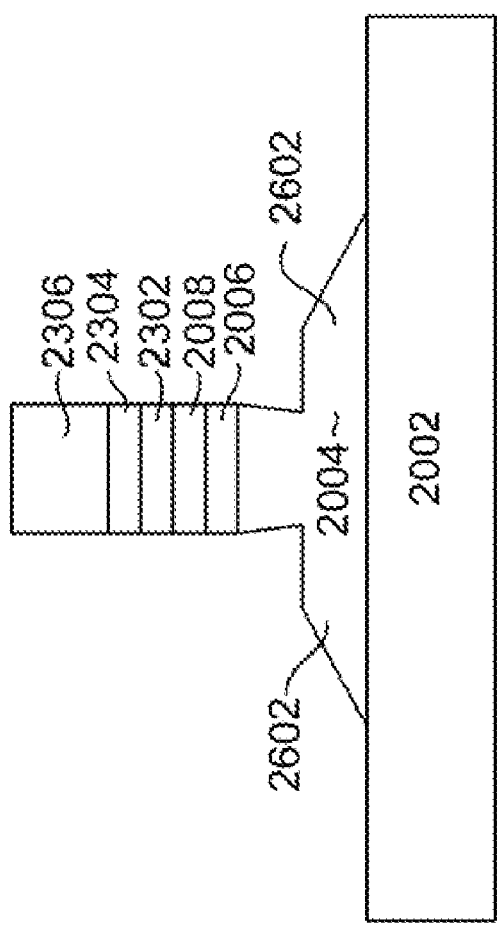
Figure 27:
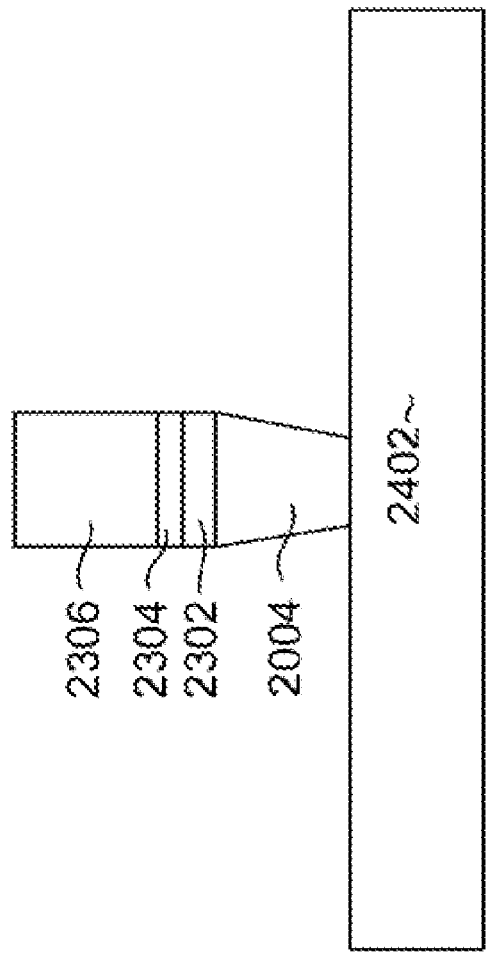

The photoresist layer 2308 is photolithographically patterned to define a write pole, and the image of the photoresist layer 2308 is transferred onto the underlying image transfer layer 2306. A reactive ion etch is performed to remove portions of the CMP stop layer 2304 that are not protected by the mask. The resulting structure can be seen with reference to FIG. 24, which shows a top down view as viewed from line 24-24 of FIG. 23. With reference to FIG. 25 an ion milling is performed to remove portions of the laminate layer that are not protected by the mask structure. The ion milling removes the photoresist layer leaving the image transfer layer 2306 as a mask. With reference to FIG. 26 it can be seen that shadowing from the extra height of the layers 2006, 2008 results in a wide step 2602 being formed. This can be compared with the write pole 2004 shown in FIG. 27 where the write pole 2004 forms a trapezoidal pole tip. As with the above, previously described embodiment, the wide stepped flare 2004 2602 forms a secondary flare point having a front edge 2502 as seen in FIG. 25.

Figure 28:
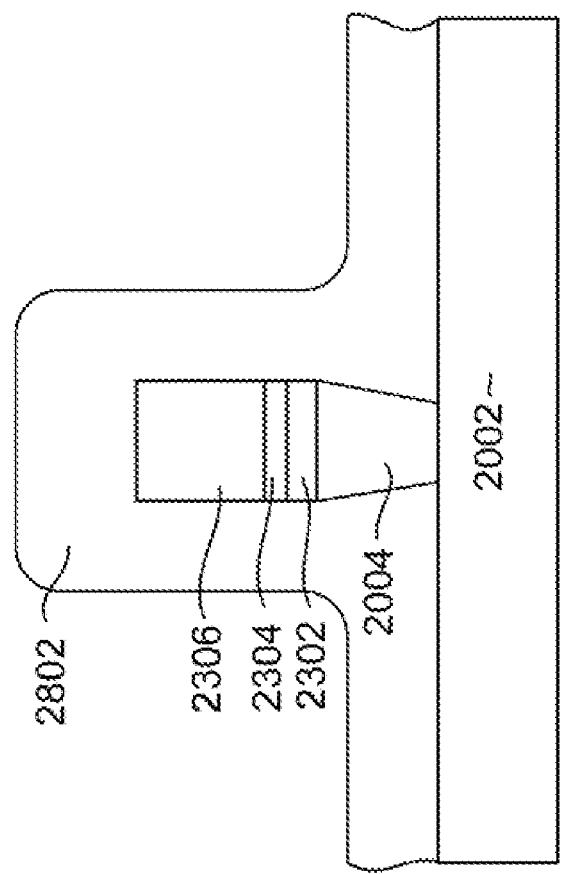
Figure 29:
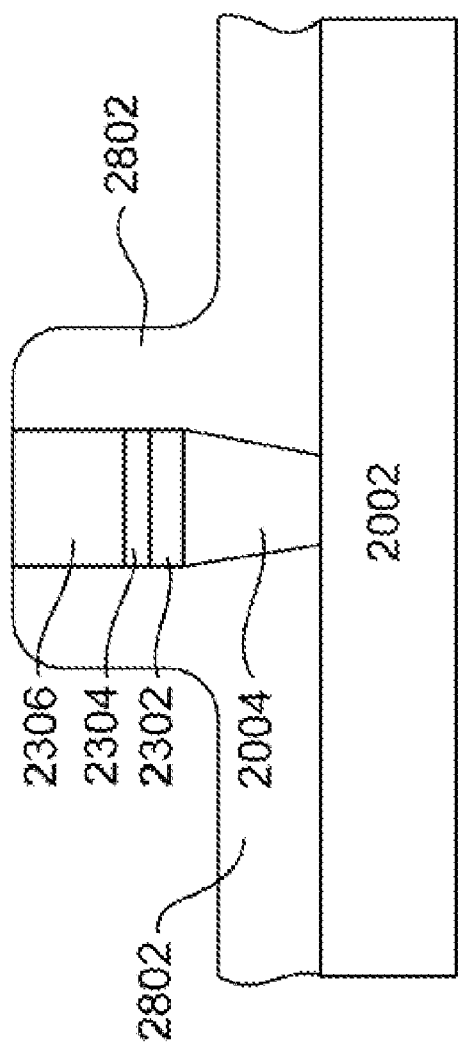

With reference now to FIG. 28, a layer of non-magnetic side gap material 2802 is deposited. The layer 2802 is preferably alumina, deposited by a conformal deposition method such as ALD or CVD, and can be deposited to a thickness of 45-55 nm or about 50 nm. Then, a time-controlled ion milling is performed to recess the alumina layer 2802 and to define side walls having a desired thickness as shown in FIG. 29. The resulting non-magnetic side walls 802 can have a thickness of, for example, 65-75 nm or about 70 nm.

Figure 30:
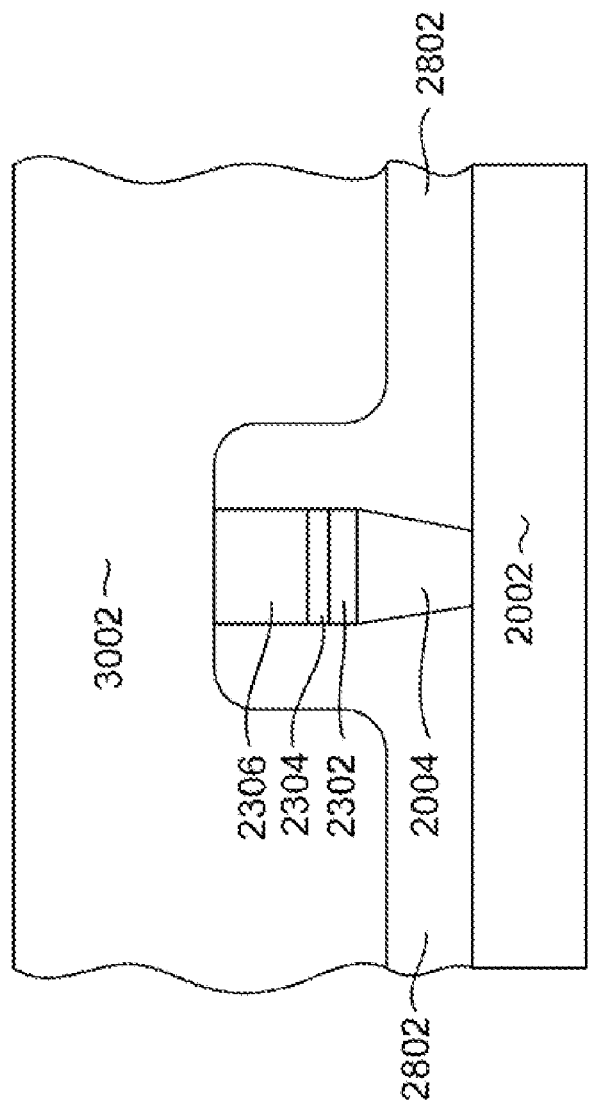
Figure 31:
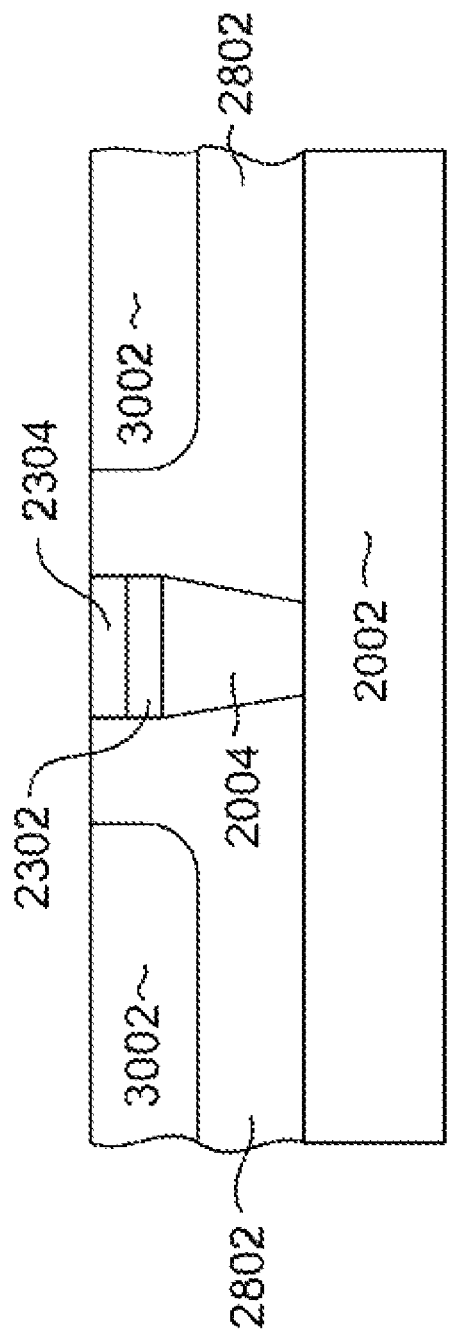

With reference to FIG. 30, a refill layer 3002 is deposited. The refill layer can be, for example $SiO_2$. Then, with reference to FIG. 31, a chemical mechanical polishing process (CMP) is performed. The CMP process removes the remaining image transfer layer 2306 and forms a planar surface, as shown in FIG. 31.

Figure 32:
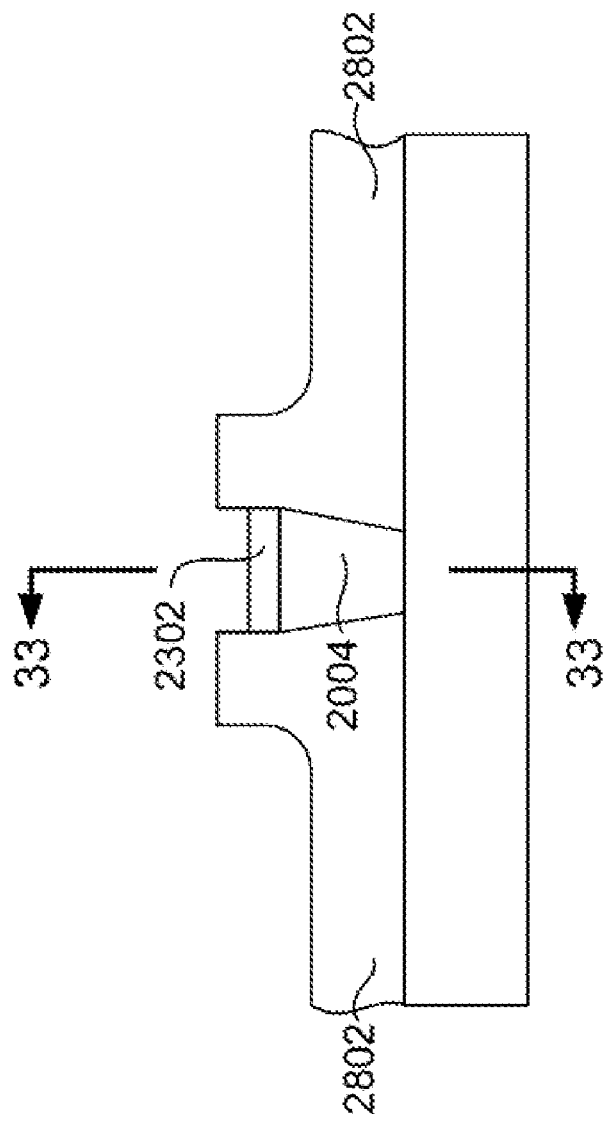
Figure 33:
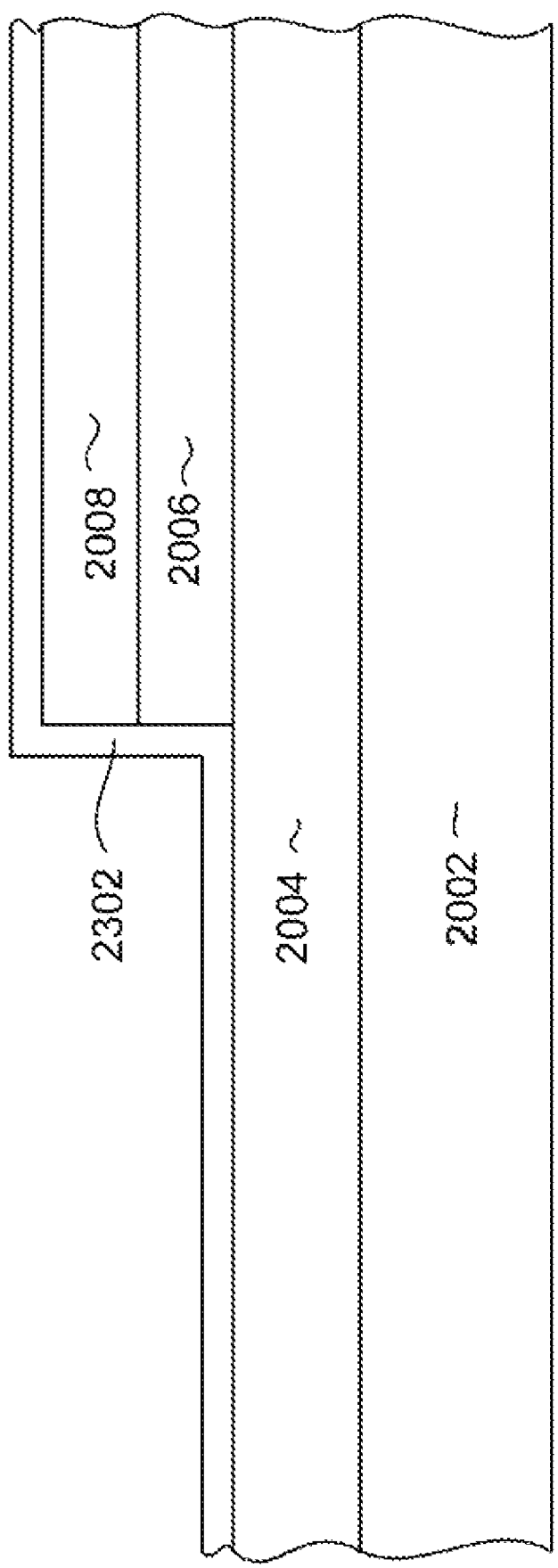

A Reactive Ion Etch is then performed to remove the refill layer 3002 and the DLC layer 2304, leaving a structure such as shown in FIG. 32 with the thin alumina mask as intact. FIG. 33 shows a side, cross sectional view of the structure thus far, the view being taken from line 33-33 of FIG. 32. As can be seen, the thin alumina mask 2302 extends over the magnetic layer 2006 and non-magnetic spacer layer 2008.

Figure 34:
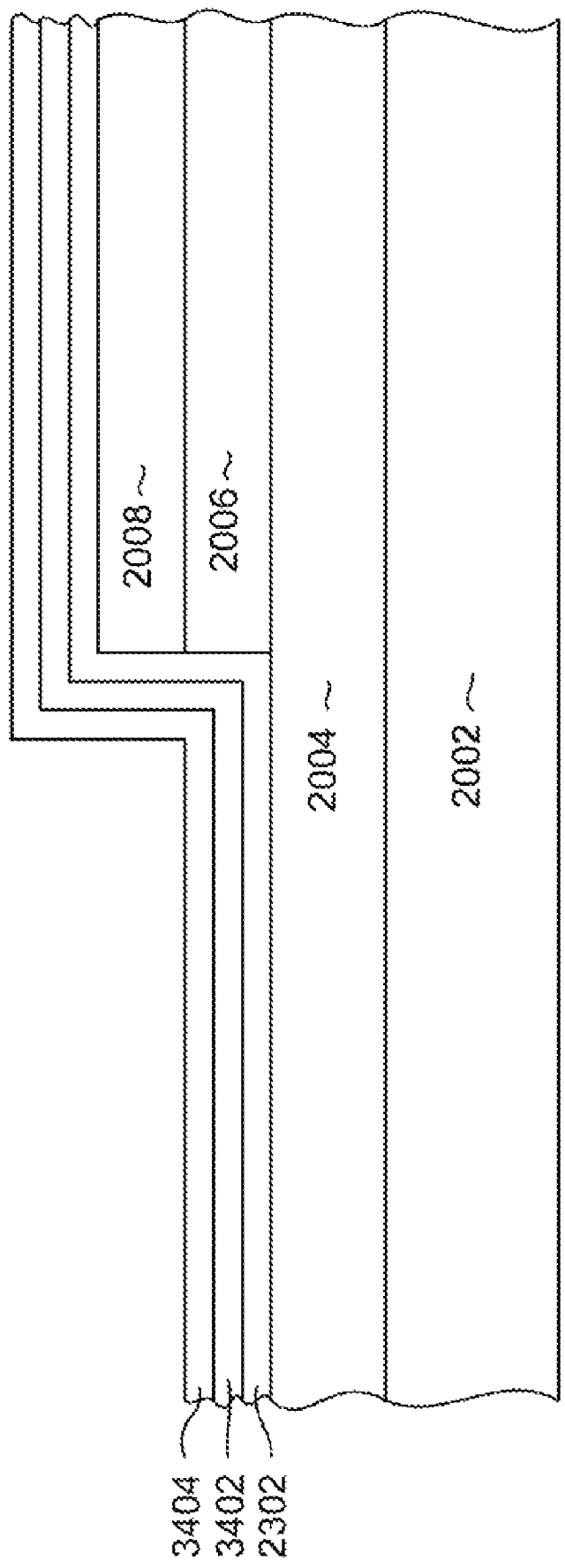
Figure 35:
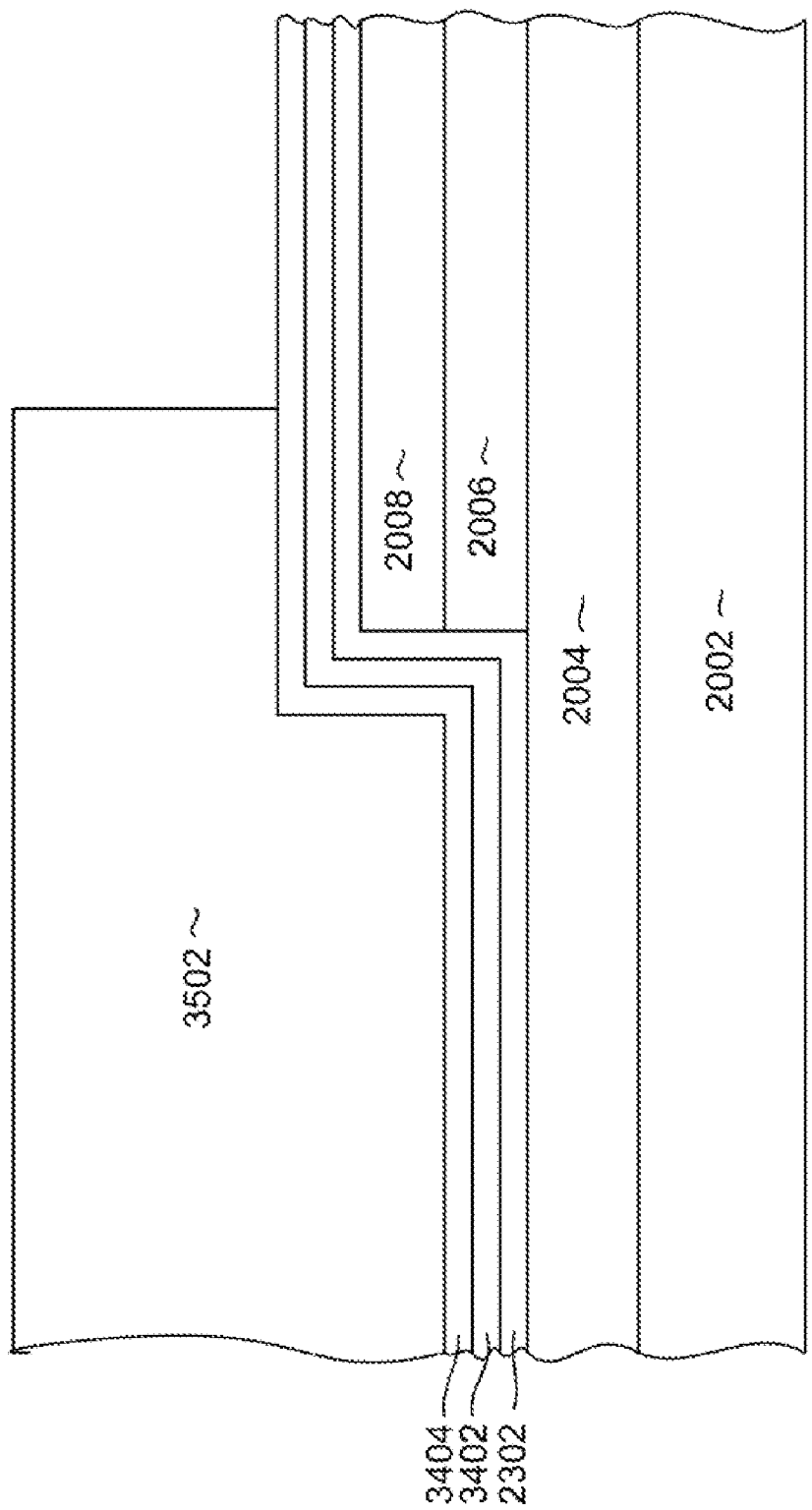

Then, with reference to FIG. 34) a Ru seed 3402 layer having a thickness of 20-30 nm or about 25 nm is deposited, followed by a CoFe seed layer 3404 that can be thinner, such as about 5 nm thick. Then, with reference to FIG. 35 a masking and plating operation can be performed to deposit a magnetic material to form a magnetic trailing shield 3502. The Ru layer 3402 and thin alumina layer 2302 together define the thickness of a trailing gap for the magnetic shield 3502.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head for perpendicular magnetic recording, comprising:
    providing a substrate;
    depositing a write pole material over the substrate;
    depositing a magnetic layer over the write pole material;
    depositing a non-magnetic spacer layer over the magnetic layer;

forming a first mask structure over the write head, the mask structure having a front edge that is located a desired distance from an intended air bearing surface plane;

performing a material removal process to remove portions of the magnetic layer and non-magnetic spacer that are not covered by the first mask structure;

forming a second mask structure, the second mask structure being configured to define a write pole; and performing an ion milling to remove portions of the write pole material to define a write pole, wherein shadowing from the magnetic layer and non-magnetic spacer layer during ion milling causes an under milling of write pole material resulting in the write pole having an outward extending stepped structure, the outward extending flare structure defining a write pole flare point.

2. A method as in claim 1 wherein the material removal process comprises a reactive ion etching to remove portions of the non-magnetic spacer layer that are not covered by the first mask structure and an ion milling to remove portions of the magnetic layer that are not protected by the first mask structure.

3. A method as in claim 1 wherein the magnetic material comprises CoFe.

4. A method as in claim 1 wherein the non-magnetic spacer comprises $SiO_2$ or SiN.

5. A method as in claim 1 further comprising:
after performing the material removal process to remove portions of the magnetic layer and non-magnetic spacer layer that are not protected by the first mask structure, and before forming the second mask structure;
depositing a non-magnetic hard mask layer;
after performing an ion milling to define the write pole, depositing a non-magnetic side gap layer; and
performing an ion milling to preferentially remove horizontally disposed portions of the non-magnetic side gap layer to form first and second non-magnetic side layers at first and second sides of the write pole; and
depositing a magnetic material to form a trailing shield.

6. A method as in claim 5 wherein the ion milling is performed at 50-60 degrees relative to normal.

7. A method as in claim 5 wherein the non-magnetic side gap material comprises alumina.

8. A method as in claim 5 wherein the depositing a non-magnetic side gap material comprises depositing alumina by atomic layer deposition.

9. A method as in claim 5 wherein the depositing a non-magnetic side gap material comprises depositing alumina by chemical vapor deposition.

10. A method as in claim 5 wherein the non-magnetic hard mask layer is deposited to a thickness to define a desired trailing gap between the write pole and the trailing magnetic shield.

11. A method for manufacturing a magnetic write head comprising:
providing a substrate;
depositing a write pole material over the substrate;
depositing a magnetic layer over the write pole material
depositing a non-magnetic spacer layer over the magnetic layer;
forming a first mask structure having an edge located a desired distance from an intended air bearing surface plane;
performing a first ion milling to remove portions of the non-magnetic spacer layer and magnetic layer that are not protected by the first mask structure;
removing the first mask structure;
depositing a hard mask layer;
depositing a CMP stop layer;
forming a second mask structure, configured to define a write pole;
performing a second ion milling to remove portions of the CMP stop layer, hard mask and write pole material that are not protected by the second mask structure, wherein shadowing from the magnetic layer and non-magnetic spacer layer cause an undermining resulting in a stepped flare structure;
conformally depositing a non-magnetic side gap material;
depositing a refill layer;
performing a chemical mechanical polishing sufficiently to expose the CMP stop layer, and
performing a reactive ion etching to remove the CMP stop layer.

12. A method as in claim 11 wherein the magnetic material layer comprises CoFe.

13. A method as in claim 11 wherein the non-magnetic spacer layer comprises a material selected from the group consisting of, Rh, Ir and Ru.

14. A method as in claim 11 wherein the hard mask layer comprises alumina and is deposited to a thickness to define a trailing gap layer.

15. A method as in claim 11 wherein the CMP stop layer comprises diamond like carbon (DLC).

16. A method as in claim 11 wherein the refill layer comprises $SiO_2$.

17. A method as in claim 11 wherein the reactive ion etching removes the refill layer.

18. A method as in claim 11 wherein the reactive ion etching removes the refill layer, the method further comprising:
after performing the reactive ion etching, depositing a magnetic material to form a magnetic trailing, wrap around shield.

19. A method as in claim 11 wherein the reactive ion etching removes the refill layer, the method further comprising:
after performing a reactive ion etching, depositing a Ru seed layer;
depositing a CoFe seed layer over die Ru seed layer;
forming a third mask structure having an opening configured to define a trailing magnetic shield; and
electroplating a magnetic material to form a trailing magnetic shield.

20. A method as in claim 19 wherein the hard mask layer and the Ru seed layer are each deposited to a thickness that their combined thicknesses define a desired trailing gap thickness.

* * * * *